United States Patent [19]
Mitsui et al.

[11] Patent Number: 6,034,740
[45] Date of Patent: Mar. 7, 2000

[54] KEYING SYSTEM AND COMPOSITE IMAGE PRODUCING METHOD

[75] Inventors: Kenji Mitsui; Yoshitomo Sako, both of Yokohama, Japan

[73] Assignee: Kabushiki Kaisha Photron, Tokyo, Japan

[21] Appl. No.: 08/739,274

[22] Filed: Oct. 29, 1996

[30] Foreign Application Priority Data

Oct. 30, 1995 [JP] Japan ................................. 7-011490 U
Mar. 1, 1996 [JP] Japan .................................... 8-044793
May 21, 1996 [JP] Japan .................................... 8-125484

[51] Int. Cl.$^7$ ....................................................... H04N 9/75
[52] U.S. Cl. .......................... 348/587; 348/586; 348/592; 348/722; 348/240
[58] Field of Search ..................................... 348/586, 587, 348/592, 580, 581, 583, 239, 240, 552, 590, 591, 593, 722; H04N 9/75

[56] References Cited

U.S. PATENT DOCUMENTS

| | | | |
|---|---|---|---|
| 3,914,540 | 10/1975 | Slater | 348/211 |
| 4,092,673 | 5/1978 | Adams | 348/211 |
| 4,200,890 | 4/1980 | Inaba et al. | 348/587 |
| 4,393,394 | 7/1983 | McCoy | 348/587 |
| 5,220,848 | 6/1993 | Basilico | 348/211 |
| 5,630,037 | 5/1997 | Schindler | 345/431 |
| 5,737,031 | 4/1998 | Tzidon et al. | 348/587 |

FOREIGN PATENT DOCUMENTS

WO 90/16131 12/1990 United Kingdom .

OTHER PUBLICATIONS

Leonard, Eugene, "Consideration Regarding the Use of Digital Data to Generate Video Backgrounds," SMPTE Journal, vol. 87, Aug. 1978, pp. 499–504.

Primary Examiner—Michael H. Lee
Assistant Examiner—Jean W. Désir
Attorney, Agent, or Firm—Finnegan, Henderson, Farabow, Garrett & Dunner, L.L.P.

[57] ABSTRACT

In a keying system, an image of an object is gained and a plurality of the background images each of which is obtained correspondingly to a view angle of a view point in a three-dimensional space to be imaged and a view position of the view point therein are stored on a memory device. The background image from the plurality of background images stored in the memory device is selectively read according to the view angle and the view position preliminarily defined in accordance with the image of the object. A chroma-keying composition is performed between the background image and the image of the object thereby producing a composite image.

19 Claims, 15 Drawing Sheets

KEYING SYSTEM AND COMPOSITE IMAGE PRODUCING METHOD

BACKGROUND OF THE INVENTION

1. Field of the Invention

The present invention relates to a keying system for combining a foreground image and a background image into a composite image, and a method of producing the composite image, which are used in, for example, a virtual studio or the like. More particularly, the present invention relates to a keying system, whose system configuration is simplified, and to a method of producing the composite image easily.

2. Description of the Related Art

In a studio or the like of a television station, a set built from sceneries (or scenes) and so on is provided behind a performer such as an announcer. The set which has been once built, should be kept in a suitable place until used next time. Hence, the problems of how to secure the safekeeping place and how to raise safekeeping expenses have arisen.

Thus, there has been known a chroma-key system wherein a virtual set is made as a background image by a high-performance computer having a high-speed graphics processing function by which a real-time rendering and a real-time texture mapping and so forth can be achieved, and whereby this background image and a foreground image obtained by taking an image of an object such as an announcer are combined by keying to realize a virtual studio.

In the case of this system, for instance, the image of the announcer, who is reading news in front of a blue screen for a chroma key in a studio of a television station or the like, is taken as the foreground image by a television camera and so on. Subsequently, a background image generated in real time as a result of a graphics processing performed by the high-performance computer is superimposed on this foreground image. Then, the superimposed portion of the background image and foreground image is blanked out by keying process. Further, a composite image is obtained by fitting an object's image portion of the foreground image into the blank portion. As a consequence, the foreground and background images can be shown as if the object's image portion of foreground image (namely, the announcer) is placed in front or in rear of the background image (namely, the virtual set).

However, in the case of such a conventional chroma-key system, the background image is generated in real time, so that a costly high-performance computer having a high-performance processing CPU and high-performance image processing circuits must be used. Thus, there have been caused problems in that high-level running skills to run the costly high-performance computer by using complicated programs are needed. Moreover, the cost of the conventional chroma-key system becomes high because the cost of the high-performance processing CPU itself is high and, in addition, the cost of the high-performance image processing circuits is high owing to using an enormous circuit elements for performing the high-performance imaging process. Therefore, such a conventional chroma-key system cannot be used if not in a large-scale facility such as a key station.

Further, in the case of using the aforementioned high-performance computer, it is necessary to secure the safekeeping place and to raise maintenance expenses and personnel expenditures for employing engineers of sophisticated skills. Thus, problems similar to those in the case of using the actual studio which has the sets built from the scenes have arisen.

Judging from the current state-of-the-art in technologies, the aforementioned computer realizes advanced high-speed graphics processing functions. The aforementioned computer (system) is, therefore, in danger of coming down suddenly during the operation of the advanced high-speed graphic process. To avoid such danger, duplex high-performance computer systems should be provided, with the result that the cost is further increased.

SUMMARY OF THE INVENTION

The present invention is accomplished to solve the aforementioned problems.

It is, accordingly, an object of the present invention to realize a keying system by preliminarily producing a large number of background images and recording the produced background images onto a disk or the other similar storage media and performing a keying composition operation by using the background images without using a high-performance computer having advanced graphics processing functions, thereby simplifying the system configuration, reducing the cost thereof, and producing the composite image easily.

In order to achieve the such object, according to one aspect of the present invention, there is provided a keying system comprising means for gaining an image of an object, a memory device for preliminary storing a plurality of background images each being obtained correspondingly to at least one of a view angle of a view point in a three-dimensional space to be imaged and a view position of the view point therein, control means for selectively reading at least one image from the plurality of background images stored in the memory device according to at least one of the view angle and the view position preliminarily both defined in accordance with the image of the object, and keying-composition means for performing a keying composition between the at least one image read by the control means and the image of the object thereby producing a composite image.

In preferred embodiment of this aspect, the keying-composition means comprises a chroma keyer performing a chroma-keying composition between the at least one image and the image of the object thereby producing the composite image and the memory device has a disk array unit preliminary storing the plurality of background images.

This aspect of the present invention has an arrangement that the gaining means comprises camera means having a camera for taking the image of the object lying in front of a screen for chroma-keying and having a camera head on which the camera is mounted for variably controlling at least one of an image-taking angle of the camera and an image-taking position thereof. Further aspect of the present invention has an arrangement that the defined view angle corresponds to the image-taking angle of the camera at a time of taking the image and the defined view position corresponds to the image-taking position thereof at the time thereof.

For achieving the such object, according to another aspect of the present invention, there is provided a composite image producing method comprising the steps of gaining an image of an object, preliminary storing a plurality of background images in a memory device, each of said images being obtained correspondingly to at least one of a view angle of a view point in a three-dimensional space to be imaged and a view position of the view point therein, selectively reading at least one image from the plurality of background images stored in the memory device according to at least one of the view angle and the view position preliminarily both defined in accordance with the image of the object, and performing a keying composition between the at least one image and the image of the object thereby producing the composite image.

For the purpose of achieving the such object, according to another aspect of the present invention, there is provided a keying system comprising a memory device for preliminary storing a plurality of background images each being obtained correspondingly to at least one of a view angle of a view point in a three-dimensional space to be imaged and a view position of the view point therein, camera means having a camera for taking an image of an object, input means for inputting at least one of an image-taking angle data of the camera and an image-taking position data thereof, variable control means on which the camera is mounted for variably controlling at least one of an image-taking angle of the camera and an image-taking position thereof according to the at least one of the image-taking angle data and the image-taking position data inputted by the input means so as to take the image of the object by the camera means on the basis of the at least controlled image-taking angle and the controlled image-taking position, control means for selectively reading at least one image from the plurality of background images stored in the memory device according to the at least one of the view angle data and the view position data inputted thereby, and keying-composition means for performing a keying composition between the read at least one image and the taken image of the object thereby producing a composite image.

In preferred embodiment of this another aspect, the variable control means comprises a camera head on which the camera is mounted for changing the at least one of the image-taking angle and the image-taking position and a camera head controller for controlling the camera head so that the at least one of the image-taking angle and the image-taking position is defined correspondingly to the at least one of the image-taking angle data and the image-taking position data.

This another aspect of the present invention has an arrangement that the system further comprises comparison means for comparing a time period ($\tau 1$) required to variably control the at least one of the image-taking angle and the image-taking position with a time period ($\tau 2$) between at a moment at which the at least one of the image-taking angle data and the image-taking position data is inputted to the control means and at a moment at which the at least one image is outputted to the keying-composition means and adjustment means for adjusting at least one of the time period ($\tau 1$) and the time period ($\tau 2$) on the basis of the comparison result of the comparison means whereby the time period ($\tau 1$) becomes substantially equal to the time period ($\tau 2$).

With a view to achieving the such object, according to further aspect of the present invention, there is provided a keying system comprising camera means having a camera for taking an image of an object, input means for inputting at least one of an image-taking angle data of the camera and an image-taking position data thereof, variable control means on which the camera is mounted for variably controlling at least one of an image-taking angle of the camera and an image-taking position thereof according to the at least one of the image-taking angle data and the image-taking position data inputted by the input means so as to take the image of the object by the camera means on the basis of the at least controlled image-taking angle and the controlled image-taking position, a graphics computer for producing at least one background image by computer graphics processing in accordance with the at least one of the view angle data and the view position data inputted thereby, reading means for reading the produced at least one background image, and keying-composition means for performing a keying composition of the read at least one background image and the image of the object thereby producing a composite image.

In preferred embodiment of this further aspect, each of the first and second keying-composition means has a chroma-key means performing chroma-keying composition and the memory device has a disk array unit preliminary storing the plurality of background images.

In order to achieve the such object, according to further aspect of the present invention, there is provided a keying system comprising means for gaining an image of an object, a memory device for preliminary storing a plurality of background images each being obtained correspondingly to at least one of a view angle of a view point in a three-dimensional space to be imaged and a view position of the view point therein, a buffer memory capable of storing at least one frame of the background image thereon, first reading means for selectively reading at least one image at a given timing from the plurality of background images stored in the memory device according to the at least one of the view angle and the view position preliminary both defined in accordance with the image of the object, storage means for storing the at least one image read by the first reading means on the buffer memory, means for judging whether or not the at least one of the defined angle and the defined position on the image of the object is changed within predetermined limits corresponding to a predetermined number of pixels, second reading means for reading the at least one image stored in the buffer memory with shifting the at least one image by at least one pixel each along a direction of the change in case that the at least one of the defined angle and the defined position is changed within the predetermined limits, third reading means for selectively reading at least one image at the given timing from the plurality of background images stored in the memory device according to the at least one of the defined angle and the defined position in case that the at least one of the defined angle and the defined position is changed over the predetermined limits, first keying-composition means for performing a keying composition between the at least one image read by the second reading means and the image of the object thereby producing a composite image, and second keying-composition means for performing a keying composition between the at least one image read by the third reading means and the image of the object thereby producing a composite image.

For achieving the such object, according to further aspect of the present invention, there is provided a keying system comprising means for gaining an image of an object, a graphics computer for producing at least one background image by computer graphics processing, said at least one background image being produced correspondingly to at least one of a view angle of a view point in a three-dimensional space to be imaged and a view position of the view point therein, a buffer memory capable of storing at least one frame of the background image thereon, first reading means for reading the at least one background image produced by the graphics computer at a given timing according to the at least one of the view angle and the view position preliminary both defined in accordance with the image of the object, storage means for storing the at least one image read by the first reading means on the buffer memory, means for judging whether or not the at least one of the defined angle and the defined position on the image of the object is changed within predetermined limits corresponding to a predetermined number of pixels, second reading means for reading the at least one image stored in the buffer memory with shifting the at least one image by at least one pixel each along a direction of the change in case that the at least one of the defined angle and the defined position is changed within the predetermined limits, third reading means for reading at least one background image at the given timing according to the at least one of the defined view angle and the defined view position in case that the at least one of the defined angle and the defined position is changed over the predetermined limits, first keying-composition means for performing a keying composition between the at least one image read by the second reading means and the image of the object thereby producing a composite image, and second keying-composition means for performing a keying composition between the at least one image read by the third reading means and the image of the object thereby producing a composite image.

According to the keying system and the composite image producing method of the present invention, a virtual studio set can be realized on the basis of the plurality of background images which are preliminary stored on the memory device, for example the disk array unit.

Namely, the background image corresponding to the image-taking angle and the image-taking position of the image of the object, such as an announcer is selectively read from the disk array unit. Then, the keying composition (chroma-keying composition) between the read background image and the image of the object taken by, for example the camera means in real time is performed. Thereby, the virtual studio set in that the image of the object (foreground image) and background image can be shown as if the object's image portion of in the foreground image (namely, the announcer) is placed in front or in rear of the background image is realized. Thus, in the present invention, it needs that the control means only performing an operation of reading an image from the disk array unit and does not need that the control means performing the advanced high-speed (high-performance) graphics processing and the high-speed (high-performance) image processing. Consequently, a small computer such as a personal computer having an usual-performance (speed) CPU suffices for the control means. Moreover, it is not necessary to use the enormous circuit elements owing not to perform the high-performance imaging process. Therefore, both of the simplification of the system configuration and the reduction in cost can be achieved without sophisticated skills and large-scale facilities.

BRIEF DESCRIPTION OF THE DRAWINGS

Other objects and aspects of the invention will become apparent from the following description of the embodiments with reference to the accompanying drawings in which.

DETAILED DESCRIPTION OF THE PREFERRED EMBODIMENTS

Hereinafter, preferred embodiments of the present invention will be described in detail by referring to the accompanying drawings.

(First Embodiment)

Figure 1:
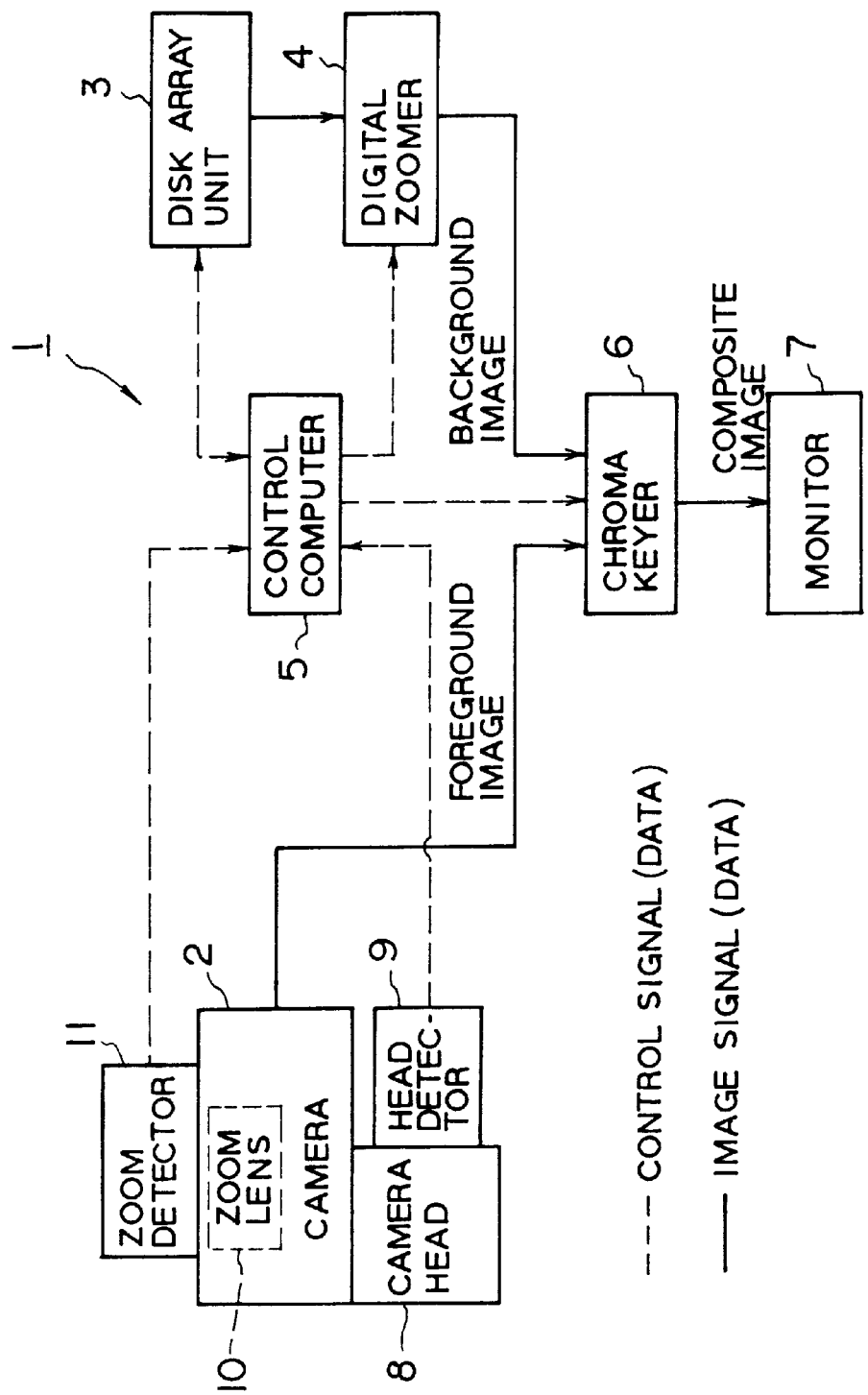
FIG. 1 is a schematic block diagram showing a whole structure of a chroma-key system according to a first embodiment of the present invention.

FIG. 1 is a block diagram illustrating the entire configuration of a chroma-key system embodying the present invention, namely, a first embodiment of the present invention. As illustrated in this figure, a chroma-key system 1 has a television camera 2, a disk array unit 3, a digital zoomer 4, a control computer 5, a chroma keyer 6 and a monitor 7, which are provided in, for example, a television studio or the like.

The television camera 2 is used to take an image of an object, for instance, an announcer and an performer in the television studio with a screen of one color, such as blue which is a complementary color of a skin color, for the background and to furnish the obtained image (namely, an obtained image signal or video signal) of the object to the chroma keyer 6 as an image for the foreground (namely, a foreground picture (also referred to as a foreground image)). Moreover, the screen of another color may be used. For example, if the object has blue eyes, the screen of green can be used. In addition, the television camera 2 may be adapted to take the image of a plurality of the objects.

The television camera 2 is placed on, for example, a camera head 8 (for example, a tripod head or an encoded camera head) of the hydraulic type, which is manufactured by O'CONNOR ENGINEERING LABORATORIES, so that an image-taking direction, in which an image is taken by the camera 2, can be changed (or turned) to a panning direction (namely, a direction to which a horizontal rotation movement of the camera is performed) and a tilting direction (namely, a direction to which a vertical rotation movement of the camera is performed). Further, a head detector 9 such as a rotary encoder is attached to this camera head 8. The head detector 9 detects angle data representing a panning angle (namely, an angle corresponding to a direction to which the camera head is panned in a horizontal plane) and a tilting angle (namely, an angle corresponding to a direction to which the camera head is tilted in a vertical plane) at the time of taking an image. Further, the head detector 9 is adapted to send the angle data to the control computer 5 as camera position data.

Moreover, the television camera 2 has a zoom lens 10. The television camera 2 is adapted so that an image-taking by zooming can be achieved by changing the zooming position (or the zoom ratio) of the zoom lens 10. A zoom detector 11 for detecting the zooming position, for example, a zoom encoder is attached to this zoom lens 10. The zooming position data detected by this zoom detector 11 is sent to the control computer 5.

The disk array unit 3 is provided or configured by connecting, for instance, a plurality of general-purpose hard disks for computers in parallel. In this embodiment, the plurality of hard disks are connected by a parity-checked RAID (Redundant Array of Independent Disks) connection system in such a manner as to function as a body. Further, an image recorded on each disks can be replaced with another by using a VTR (Video Tape Recorder). Moreover, this disk array unit 3 is constructed so that an image or video signal of, for instance, the D-1 format can be recorded and read in a non-compressed format.

On each of the disks of this embodiment, an image which corresponds to a view angle at a point of view in a three-dimensional space to be imaged of the television studio is preliminarily recorded as an image for the background (namely, a background picture (also referred to as a background image)), together with angle data representing the angle. In the case of this embodiment, a large number of images, which are actually taken on the spot at predetermined angular intervals which correspond to the panning angle and the tilting angle of the camera 2, respectively, or of computer graphics (CG) images representing various kinds of virtual sets are used as the background images. The background images are stored at each addresses of each of the disks, respectively.

Further, the disk array unit 3 can store the large number of actually taken images in a programmable manner and also can automatically record (or store) the large number of CG images.

Figure 2:
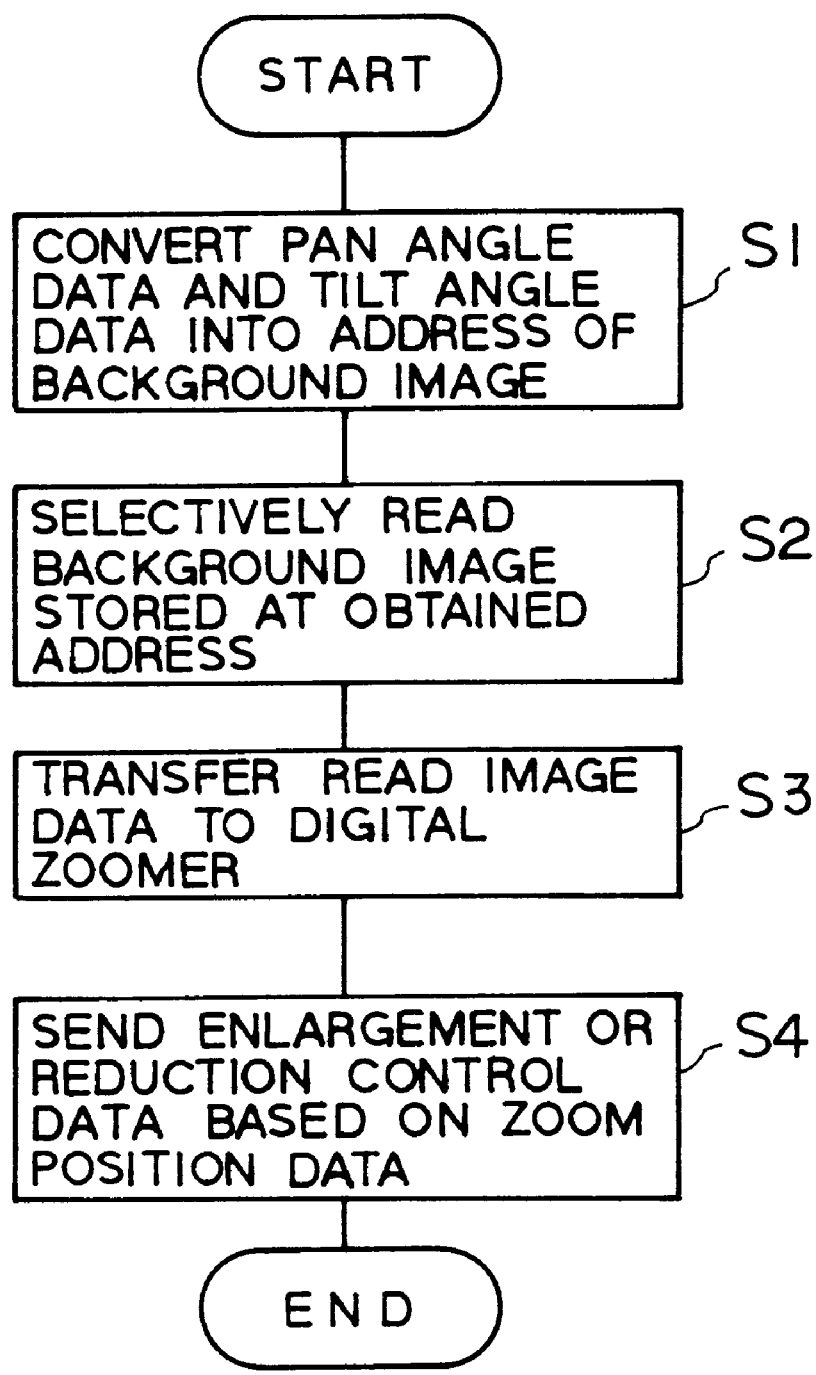
FIG. 2 is a schematic flow chart showing an example of a process performed by a control computer of the first embodiment thereof.

The control computer 5 performs an operation of reading the background image according to the positional data (namely, the panning angle data and the tilting angle data) of the television camera 2, which are sent from the head detector 8 attached to the encoded camera head 8, and to the zooming position data sent from the zoom detector 11, as illustrated in FIG. 2. Namely, the control computer 5 converts the sent positional data (namely, the panning angle data and the tilting angle data) of the camera 2 into an address in the background image (in step S1). Then, the control computer 5 refers to the background images stored in the disk array unit 3 and further selects and reads one of the background images, which is stored at the obtained address (in step S2). Subsequently, the control computer 5 transfers the read background image to the digital zoomer 4 (in step S3). Then, the control computer 5 sends enlargement or reduction control data (namely, enlargement-ratio data or reduction-ratio data) to the digital zoomer 4 (in step S4). Thus, this operation is finished. Namely, the control computer 5 has the function of selecting the background image, which corresponds to the panning angle and the tilting angle of the foreground image taken by the television camera 2, from the large number of background images recorded on the disk array unit 3 and sending the selected background image to the digital zoomer 4, and the function of sending the enlargement-ratio data or the reduction-ratio data, which corresponds to the zooming position of the zoom lens 9, to the digital zoomer 4.

The digital zoomer 4 performs an enlargement or reduction processing on the background image signal (standard NTSC video input signal or the like) transferred from the disk array unit 3 according to enlargement or reduction control data (namely, enlargement-ratio data or reduction-ratio data) sent from the control computer 5. Further, the digital zoomer 4 is adapted to give the processed background image to the chroma keyer 6. Incidentally, when performing the enlargement processing, the digital zoomer 4 is operative to simultaneously perform a bi-linear interpolation in real time. That is, the digital zoomer 4 simultaneously performs an interpolation of a horizontal direction and an interpolation of a vertical direction (an interpolation between scanning lines). So, the roughness of the background image can be inconspicuous in the case of a small enlargement ratio, in which the distance from a focal point to the foreground image is short. Moreover, the digital zoomer 4 can function as a signal converter to be used when recording a computer graphics signal onto the disk array unit 3.

Figure 3:
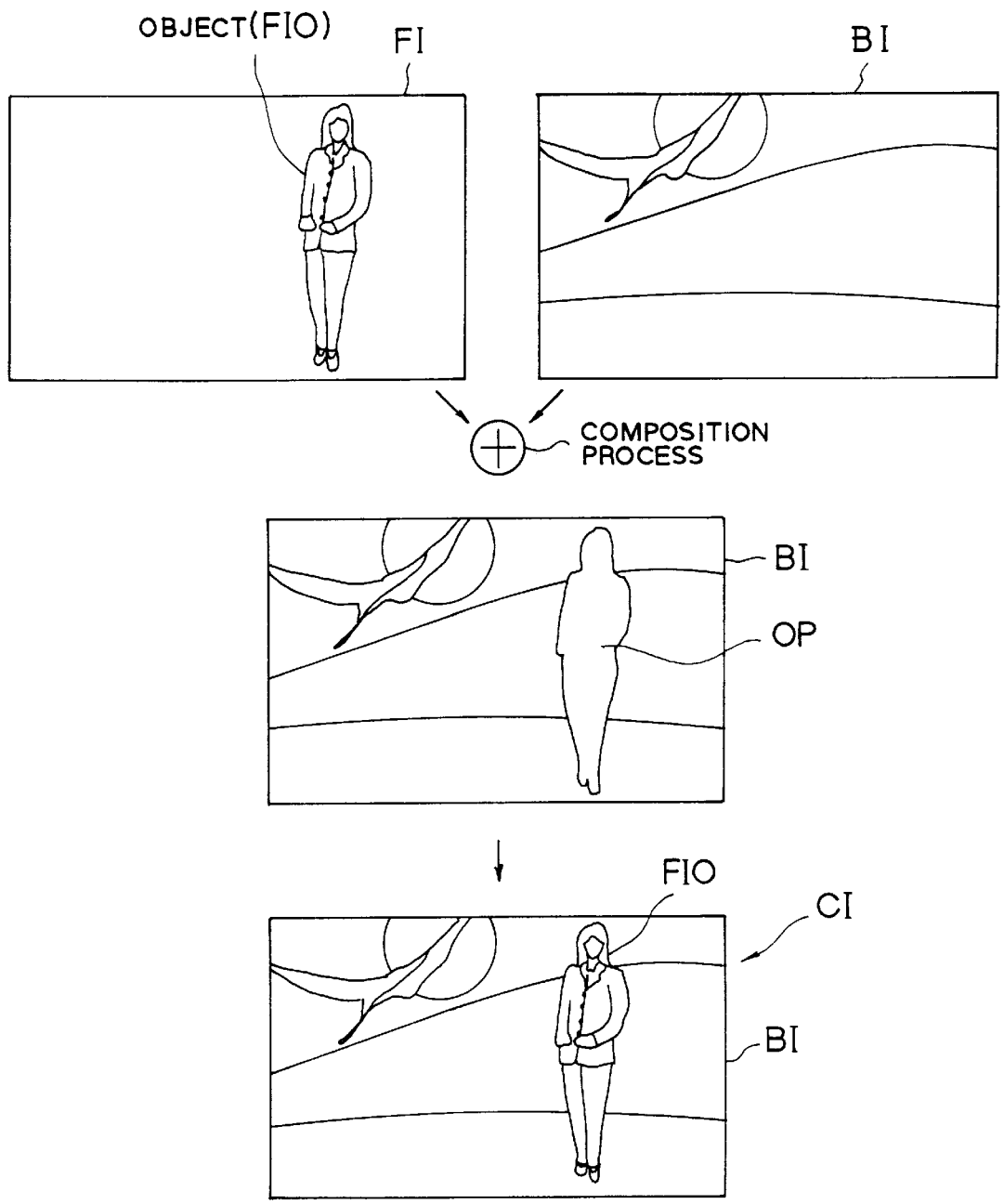
FIG. 3 is an explanation view for explaining a keying composition of a chroma-keyer of the first embodiment thereof.

The chroma keyer 6 inputs the foreground image taken by the television camera 2 therefrom and on the other hand, inputs the background image corresponding to the panning angle, the tilting angle and the zooming position which are transferred thereto from the digital zoomer 4. Further, the chroma keyer 6 performs a keying composition by superimposing the foreground image on the inputted background image as shown in FIG. 3. Namely, the chroma keyer 6 superimposes the foreground image FI on the background image BI by the keying composition and subsequently, blanks the overlapping portion OP of the background image BI in accordance with what is called a polyhedron slice method by which the foreground image FI is clipped in a three-dimensional way on the basis of the differences in hue and luminance between the foreground image FI and a screen for chroma-keying, as shown in FIG. 3. Then, the composition (namely, the keying composition) is performed by fitting the object's image portion FIO of the foreground image FI into the blanked portion OP of the background image BI, as shown in FIG. 3.

A virtual composite image CI obtained by performing the keying composition between the foreground image and the background image in this way is outputted to the monitor 7 (or a television receiver, or other similar displaying device), so that the composite image CI is displayed on the screen of the monitor 7, as shown in FIG. 3.

Next, an operation of this embodiment will be described hereinbelow. Moreover, in FIG. 1 and other figures showing a block diagram, a signal (a data) representing a control signal (data) or other similar signals (data) are shown as a broken line. On the other hand, a signal (a data) representing a video signal (data) or other similar signals (data) are shown as a solid line.

First, a camera operator manipulates the camera head 8 thereby changing the image-taking direction (namely, the image-taking angle) so as to take an image of an object such as an announcer who lies in front of the blue screen. Then, video data representing the image taken by the television camera 2 is sent to the chroma keyer as data representing a foreground image. Further, the panning angle and the tilting angle of the camera 2 upon taking the foreground image are detected by the head detector 9 attached to the encoded camera head 8 and are then sent to the control computer 5. Moreover, the zooming position of the zoom lens 10 upon taking the foreground image is detected by the zoom detector 11 and then, data representing the detected zooming position is sent to the control computer 5.

In the control computer 5, the operation of FIG. 2 is performed according to the panning angle data, the tilt angle data, and the zooming position data, which have been sent thereto. Thus, among a plurality of background images recorded on the disk array unit 3, the background image corresponding to the panning angle data and to the tilting angle data is read therefrom at, for example, an image reproduction rate (60 fields per second (namely, 30 frames per second)) (in steps S1 and S2) and is then transferred to the digital zoomer 4 (in step S4). Subsequently, the background image transferred to the digital zoomer 4 is enlarged or reduced according to the control signal based on the zooming position, which is sent from the control computer 5, at the enlargement or reduction ratio corresponding to the zooming position of the foreground image. Then, the processed background image is sent to the chroma keyer 6.

Thereafter, the keying composition between the foreground image sent to the chroma keyer 6 and the background image corresponding to this foreground image is performed by the chroma keyer 6. As a result, the virtual composite image with high reality is produced. This virtual composite image is displayed on the monitor 7.

Consequently, it appears to persons who observe the displayed composite image, that the announcer or the like of the foreground image is united with the virtual set of the background image as shown in FIG. 3. Thus, what is called a virtual studio can be realized.

In the case of this embodiment, such a virtual studio set is realized by preliminary recording the plurality of background images such as computer graphics images and images taken on the spot on the plurality of disks of the disk array unit 3 at different angular intervals. Namely, the background image corresponding to the panning angle and the tilting angle of the foreground image is read by the control computer 5 from the disk array unit 3 in which the large number of background images are stored. Then, the keying composition between the read background image and the foreground image which is taken in real time is performed. Thereby, the virtual studio set in that the foreground image and background image can be shown as if the object's image portion of the foreground image (namely, the announcer) is placed in front or in rear of the background image is realized. Thus, the control computer 5 of this embodiment has substantially only to perform an operation of reading an image from the disk array unit 3 of FIG. 2 and does not need to perform the advanced high-speed (high-performance) graphics processing and the high-speed (high-performance) image processing, differently from the conventional chroma-key system. Consequently, a small computer such as a personal computer having an usual-performance (speed) CPU suffices for the control computer 5. Moreover, it is not necessary to use the enormous circuit elements owing not to perform the high-performance image process.

Therefore, both of the simplification of the system configuration and the reduction in cost can be achieved without sophisticated skills and large-scale facilities.

Further, the use of sceneries for realization of a background (set), which is similar to the background image, in a studio causes difficulties in production of the background (set) and results in an extended period of production thereof. Moreover, such use of sceneries incurs increased cost due to the safekeeping of the background set and brings about a large-scale studio. However, in accordance with the present invention, these problems can be almost eliminated or relieved. Furthermore, in the case that the background image is produced by utilizing computer graphics, a scene which cannot be physically produced from the real things, for example, an image of a matter floating in the air can be generated as the background image. Thus, a very novel background image can be produced. Moreover, a virtual studio using the novel background image can be realized.

The keying composition is performed so that the foreground image is fitted into the background image which corresponds to the image-taking angle and the zoom ratio of the foreground image. Thus, the reality of the composite image obtained by the keying composition can be enhanced.

Because the chroma keyer 6 employs the polyhedron slice method for the chroma-keying composition, as compared with the conventional chroma-keying method, a soft and delicate tone image portion can be converted into a key signal so that the extremely sharp composite image can be produced by using the polyhedron slice method.

Furthermore, the disk array unit 3 of this embodiment can record (or store) background images, such as images taken on the spot or CG images, in the non-compressed format. Thereby, the picture quality of these background images can be improved.

Incidentally, various types of disk array units may be used instead of the disk array unit 3. Namely, a type of disk array unit, by which a compression recording can be performed, and another type of units, by which both of compression and non-compression recording can be performed as the occasion demands. The compression recording of a background image has merits of increasing the maximum number of background images recorded on the unit and of enhancing the reality of the images, as compared with the case of employing the non-compression recording.

The disk array unit 3 of this embodiment is also composed of the parity-checked RAID system. In the case that this parity-checked RAID system is employed, even when one of disks is damaged during the parallel running of the disks, the recording and reproducing of data can be achieved as usual. Consequently, the reliability of the unit can be enhanced.

In this embodiment, the correspondence relation between the foreground image and the background image is established in terms of the angle data (representing the panning angle and the tilting angle) of the camera. The present invention, however, is not limited to this. The correspondence relation between the foreground image and the background image may be established in accordance with the position data, such as the horizontal position data (namely, the movement data of the camera) (alternatively, the correspondence relation therebetween may be established in accordance with both of the angle data and the horizontal position data).

For instance, in the case that the correspondence relation therebetween is established in accordance with both of the angle data and the position data, the background image is preliminary taken at predetermined angular intervals corresponding to both of the panning angle and the tilting angle of the camera 2 and at positional intervals corresponding to the horizontal movement position thereof, and is also preliminary recorded on the disk array unit 3. Then, when the foreground image is taken, the angle data, which represent the panning angle and the tilting angle, and the horizontal position data of the camera 2 are detected by the head detector 9. Subsequently, the background image corresponding to the read angle and position data is read from the disk array unit 3.

With such a configuration, this embodiment can produce the composite image by the keying composition using the background image which corresponds not only to the angular change of the camera 2 but also to the positional change thereof. Thereby, a virtual studio with higher reality can be realized.

Figure 4:
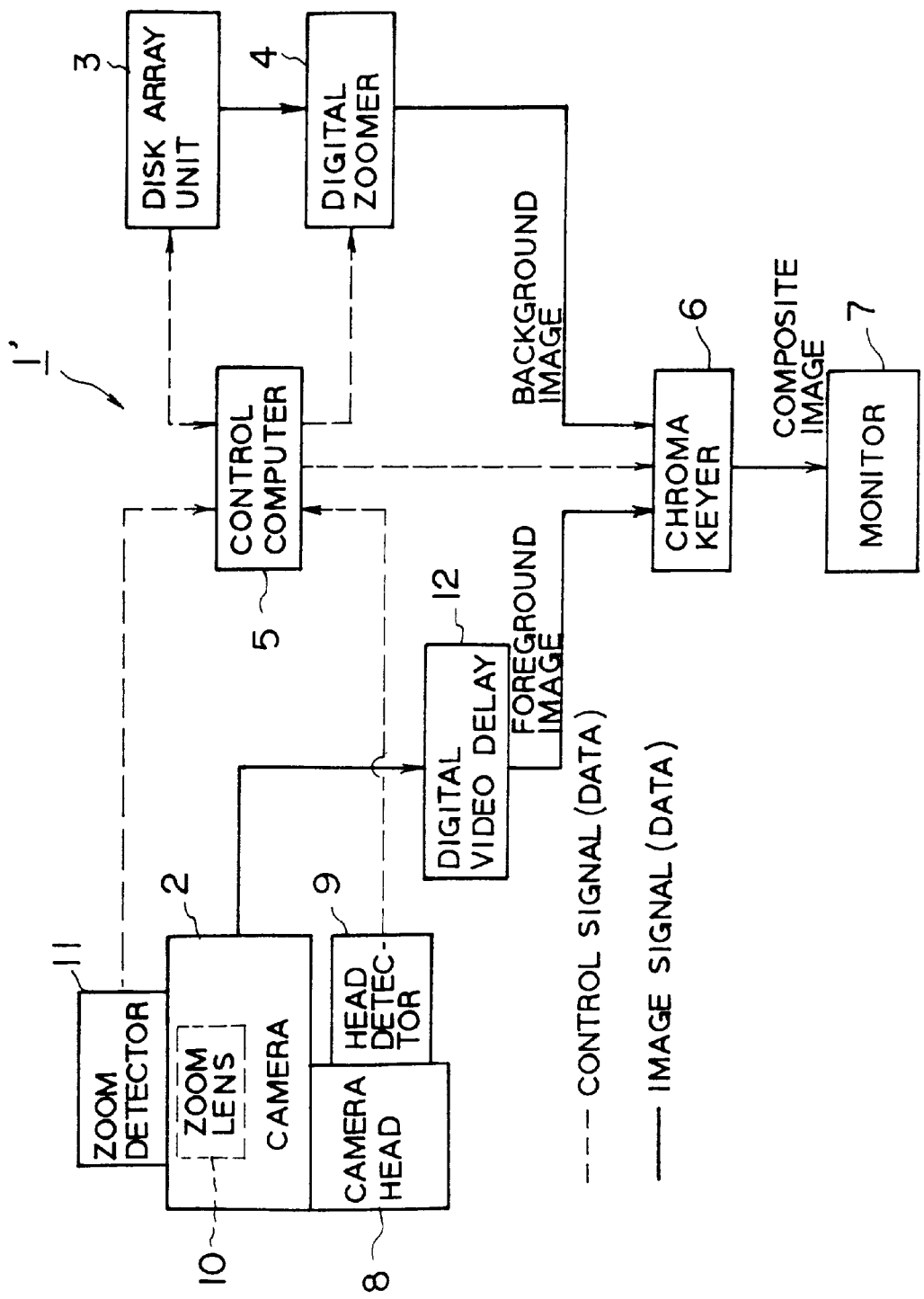
FIG. 4 is a schematic block diagram showing a whole structure of a chroma-key system according to an example of a modification of the first embodiment thereof.

Further, in the case of this embodiment, the chroma keyer 6 performs the keying composition between the foreground image sent from the camera 2 and the background image sent from the digital zoomer 4. Differently from the foreground image output operation, a background image output operation requires including various kinds of processes such as the process of reading the background image from the disk array unit 3 and processes of enlargement/reduction of the read image by means of the digital zoomer 4. Thus, the timing of the sending of the foreground image to the chroma keyer 6 is provided in such a way as to be different from that of the sending of the background image thereto (namely, the sending of the background image is delayed). In the aforementioned embodiment, such timing is regulated in the chroma keyer 6. The present invention is not limited to this method. For example, the following method may be employed. Namely, as illustrated in FIG. 4, an output of the camera 2 is once held in a digital video delay 12 for delaying the output of the camera 2 (such as the foreground image) in that the timing of the sending of the foreground image to the chroma keyer 6 and the timing of the sending of the background image from the digital zoomer 4 to the chroma keyer 6 are substantially equal each other. Then, the foreground image sending of the output of the camera 2 is delayed until the background image is outputted from the digital zoomer 4. Consequently, both of the foreground image and the background image can be outputted to the chroma keyer 6 at the same time.

Meanwhile, this embodiment is configured so that the angle data and/or the horizontal position data, which correspond to the camera operator's movement manipulation of the camera head 8 itself, are detected by the head detector 9 attached to the camera head 8. The present invention, however, is not limited to this configuration.

Figure 5:
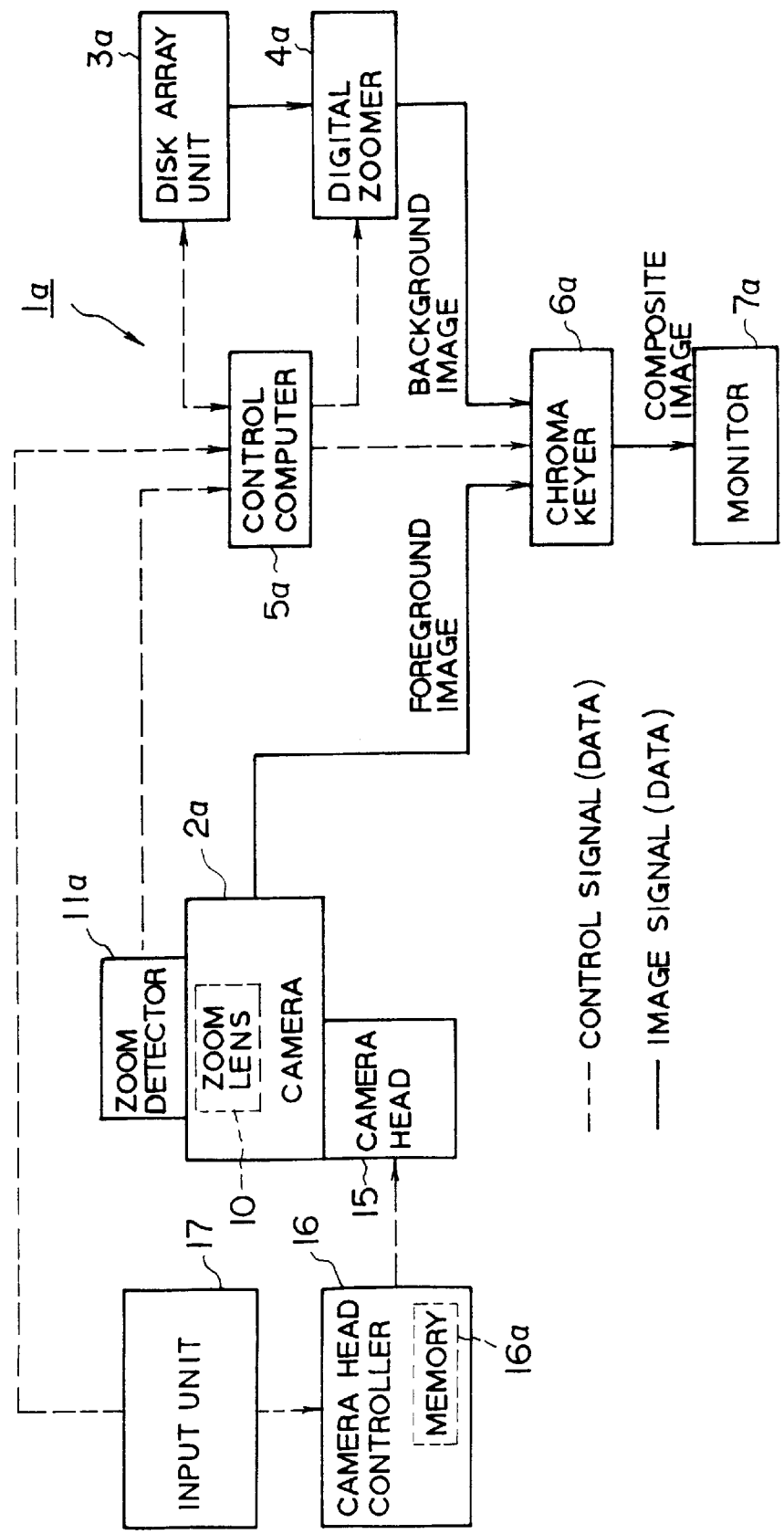
FIG. 5 is a schematic block diagram showing a whole structure of a chroma-key system according to an example of a modification of the first embodiment thereof.

For instance, an example of a modification of this embodiment is illustrated in FIG. 5. As shown in FIG. 5, a chroma-key system 1a has a camera head 15 on which a television camera 2a is placed. The camera head 15 has a driving portion such as a servomotor. A rotational drive action of this driving portion makes it possible to change (or turn) the image-taking angle (namely, the image-taking direction) of the camera 2a to an angle corresponding to both of the panning direction (namely, the direction to which the camera head 15 is panned in a horizontal plane) and the tilting direction (namely, the direction to which the camera head 15 is tilted in a vertical plane) of the camera head 15. Further, no head detector is attached to the camera head 15. Instead of a head detector, a camera head controller 16 including a computer circuit or the like having a memory 16a is connected to the camera head 15.

The camera head controller 16 is connected with an input unit 17 by which the image-taking direction (or angle) data (for instance, the panning angle data and the tilting angle data) and the image-taking position data (for example, horizontal moving-distance data) of the camera 2a can be inputted to the camera head controller 16. Namely, the camera head controller 16 controls the driving portion of the camera head 15 according to the image-taking angle data and the horizontal position data, which are sent from the input unit 17, thereby causing the camera head 15 to perform a rotational movement and a horizontal movement. Thus, the image-taking angle and the image-taking position of the camera 2a are set in such a manner as to correspond to the inputted image-taking angle data and the inputted image-taking position data, respectively.

Namely, a camera operator can perform a remote movement control operation on the camera head 15 by manipulating the input unit 17 instead of manually operating the camera head 15 itself. Further, if a monitor or other similar displaying devices (not shown) for displaying an image taken by the camera 2a is provided in the input unit 17, the camera head 15 (namely, the image-taking angle and the image-taking position of the camera 2a) can be operated by remote control while observing the image displayed on the screen of this monitor of the input unit 17, which is actually taken by the camera 2a. Thus, it is very convenient to operate the camera head 15.

For example, a remote control unit or the like may be used such as the input unit. Further, a camera head on which no camera is placed (incidentally, this camera head is other than the camera head used to take an image, and a head detector is attached to this camera head) may be used as the input unit. Namely, when the camera operator moves and operates the camera head acting as the input unit, the head detector detects the movement data (namely, the angle data and the horizontal position data) and inputs the detected data to the camera head controller 16. The camera head controller 16 controls the driving portion of the camera head 15 according to the inputted movement data (namely, the angle data and the horizontal position data). Consequently, the image-taking angle and the image-taking position of the camera 2a are set in such a manner as to be similar to the image-taking angle data and the image-taking position data, which are based on the movement data of the camera head serving as the input unit, respectively.

Moreover, the input unit 17 is connected to a control computer 5a which is adapted to perform an operation of reading a background image according to angle data and horizontal position data directly inputted from the input unit 17.

Namely, in the case of the aforementioned configuration in which the camera head 15 is moved by using the input unit 17, after the image-taking angle data and the image-taking position data are inputted by the input unit 17, a drive delay time τ1 develops until the camera head controller 16 sets the image-taking angle and the image-taking position of the camera 2a by driving and controlling the driving portion of the camera head 15 according to the inputted image-taking angle data and the inputted image-taking position data.

The control computer 5a, however, predicts the image-taking angle and the image-taking position of the camera 2a on the basis of the angle data and the horizontal position data which are sent from the input unit 17 and performs the operation of reading the background image according to the prediction. That is, at the moment when the angle data and the horizontal position data are inputted from the input unit 17, the background image based on the image-taking angle and the image-taking position of the camera 2a after the expiration of the time τ1 can be read.

Meanwhile, a delay (incidentally, let τ2 denote a delay time) develops until the background image is outputted to the chroma keyer 6a after read as above described. The composite image obtained by performing a keying composition between the foreground image and the background image delayed by the time τ2 is outputted by being delayed by the delay time τ2 with respect to real time.

At that time, in the case of the aforementioned configuration in which the camera head 15 is moved by using the input unit 17, the image-taking angle and the image-taking position can be predicted the time before the image-taking angle and the image-taking position are set and the foreground image is outputted. Thus, the background image corresponding to both of the image-taking position and the image-taking angle can be obtained by utilizing such a property thereof, simultaneously with the outputting of the foreground image by the camera 2a without delay.

That is, the control computer 5a and the camera head controller 16 compare the τ1 with the τ2, respectively and the control computer 5a and the camera head controller 16 are adapted to adjust the τ1 and the τ2 on the basis of the comparison result as follows respectively.

(1) In the case that τ1=τ2, the timing at which the foreground image is outputted to the chroma keyer 6a after the movement of the camera head 15 (namely, after the time period τ1 has passed) is the same as the timing at which the background image is outputted thereto (namely, after the time period τ2=τ1 has passed).

Figure 6:
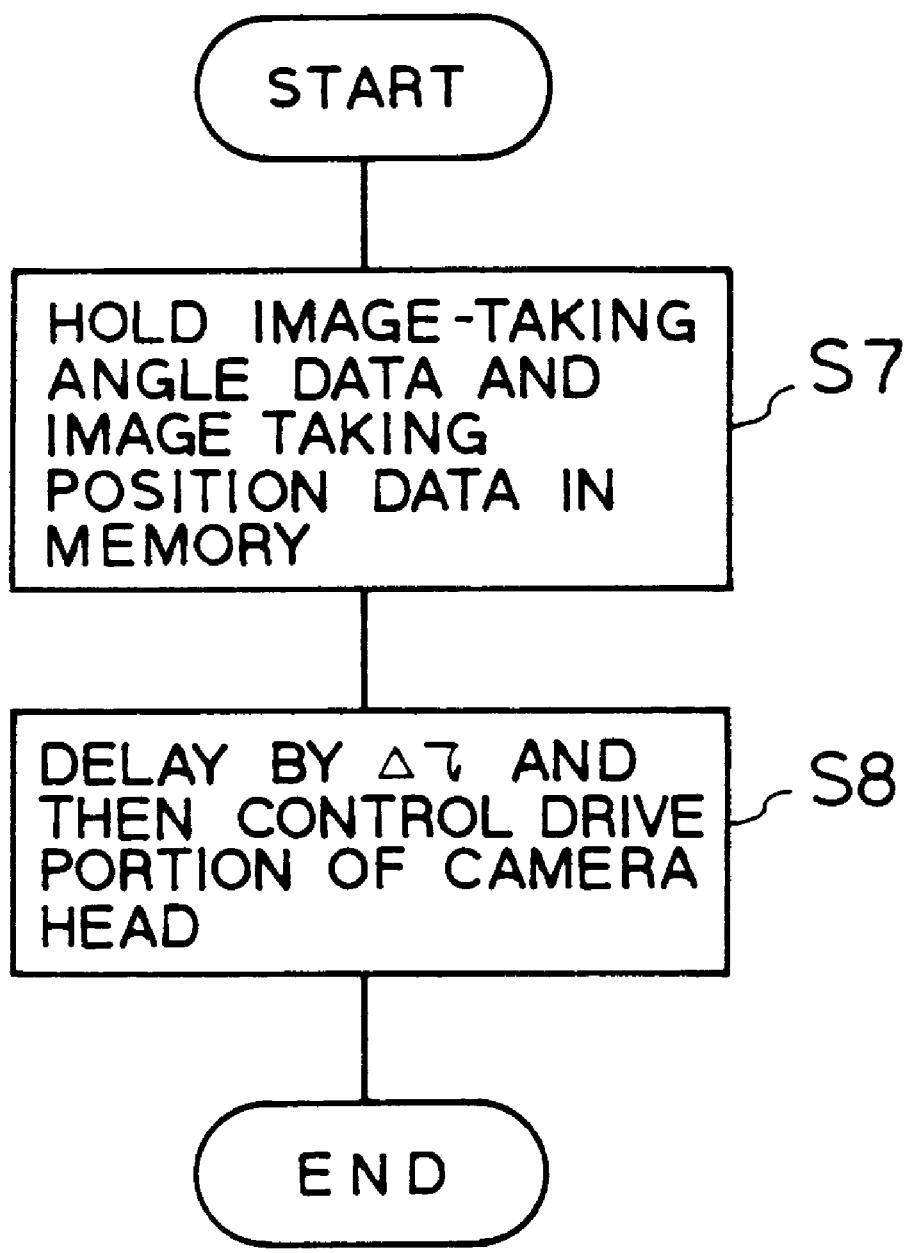
FIG. 6 is a schematic flow chart showing an example of a process performed by a camera head controller shown in FIG. 5.

(2) In the case that τ1<τ2, (namely, τ2−τ1=Δτ), the camera head controller 16 holds image-taking angle data and image-taking position data, which are sent from the input unit 17, in the memory 16a (in step S7 of FIG. 6).

Further, after delayed Δτ by holding such data, the camera head controller 16 controls the driving portion of the camera head 15 according to the image-taking angle data and the image-taking position data (in step S8).

Consequently, the timing at which the foreground image is outputted to the chroma keyer 6a after the movement of the camera head 15 (namely, after the time period τ1+Δτ=τ2 has passed) is the same as the timing at which the background image is outputted thereto (namely, after the time period τ2 has passed).

(3) In the case that τ1>τ2, (namely, τ1−τ2=ΔτA), the control computer 5a delays the reading of the background image from the disk array unit 3a according to image-taking angle data and image-taking position data, which are sent from the input unit 17, by ΔτA in the process similar to that consisting of steps S1 and S2 in FIG. 2. Consequently, the timing at which the foreground image is outputted to the chroma keyer 6a after the movement of the camera head 15 (namely, after the time period τ1 has passed) is the same as the timing at which the background image is outputted thereto (namely, after the time period τ2+ΔτA=τ1 has passed).

As described above, in the case of the chroma-key system having the configuration in which the camera head is moved by using the input unit, the background image can be obtained at the same time as at which the foreground image is outputted from the camera. Thus, the composite image can be obtained without delay behind real time.

In addition, although the system of FIG. 5 uses the head controller 16, the system may be configured so that the image-taking angle data and the image-taking position data are sent directly to the driving portion of the camera head 15 from the input unit 17. In such a configuration, the driving portion is adapted to perform the functions of the head controller. Namely, in the aforementioned case (2) (namely, in the case where τ1<τ2), the image-taking angle data and the image-taking position data sent from a input unit 17' are held in a buffer memory or the like of the driving portion for the time period Δτ. Thereafter, the driving portion drives and moves a camera head 15'. Consequently, effects similar to the aforementioned effects can be obtained.

Figure 7:
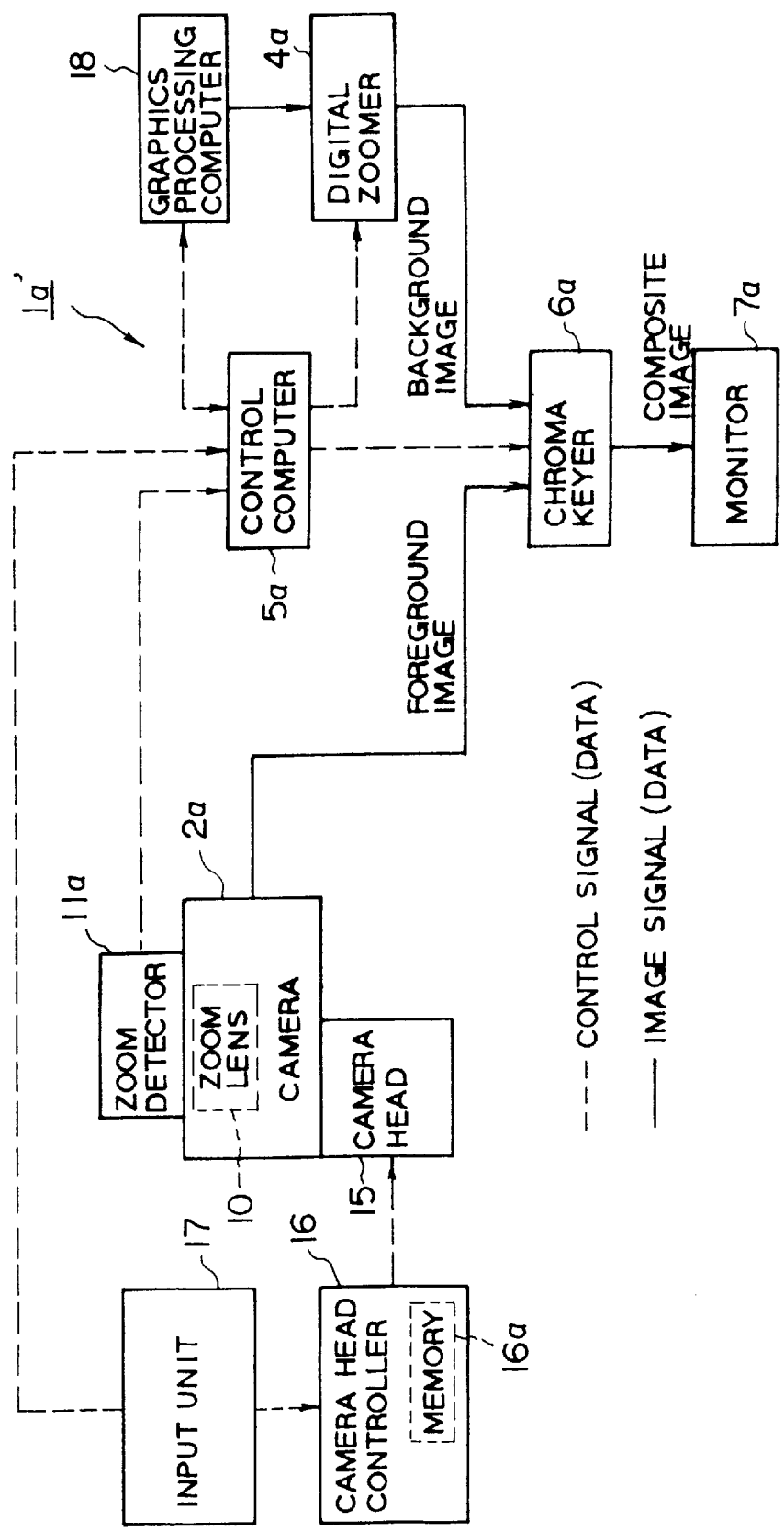
FIG. 7 is a schematic block diagram showing a whole structure of a chroma-key system modified on the basis of the chroma-key system according to the modification shown in FIG. 5.

Further, the system, to which the aforesaid method for outputting the foreground image and the background image to the chroma keyer at the same time is applied, is not limited to the aforementioned system in which the background image is read from the disk array unit. The aforementioned method can be applied to, for example, a keying system having a graphics processing computer 18, by which a background image is produced in real time by performing computer graphics (CG) processing such as a real time rendering, instead of the disk array unit 3a, as illustrated in FIG. 7.

That is, even in the case that a delay time τ2' between a moment, at which the background image produced by the graphics processing computer 18 is read, and another moment, at which the read background image is outputted to the chroma keyer 6a, the background image can be obtained simultaneously with the output of the foreground image sent from the camera by performing the processes in the aforesaid cases (1) to (3) in the chroma-key system having the configuration in which the camera head is moved by using the input unit. Thus, the composite image can be obtained without delay behind real time.

In the case of the example of the modification, the driving portion of the camera head can change the image-taking angle and the image-taking position under the control of the camera had controller. However, the system may have another configuration in which one of the image-taking angle and the image-taking position can be changed.

Moreover, in the case of this embodiment, images of the object taken by the camera are employed as the foreground images, while the large number of CG images produced by CG or the large number of actually taken images are employed as the background images. The present invention is not limited to this. For example, the large number of CG images may be employed as the foreground images. Further, images of the object taken by the camera may be employed as the background images.

(Second Embodiment)

As described in the foregoing description of the first embodiment, the large number of background images corresponding to the movement (namely, changes in angle and/or in position) of the camera are recorded on the disk array unit. However, as the recording capacity (namely, the disk capacity) of the disk array unit becomes larger, the cost and size of the disk array unit increases. It is, thus, desirable that the disk capacity of the disk array unit is be minimized and that moreover, real background images corresponding to the movement of the camera are recorded thereon.

Here, note that the according to the D-1 digital television standard, the size or area of the television screen region is represented as follows:

Size of Screen Region=720 pixels wide×486 pixels high       (1)

At that time, assuming that the moving range in the panning direction (namely, the horizontal or lateral direction) of the camera is set at a value which is two times the width of the screen region and that the moving range in the tilting range (in the vertical direction) of the camera is set at a value which is one-half the height of the screen region (incidentally, the moving range having a size of such an order is necessary for representing a real movement of the camera) (see FIG. 8), the number of frames of background image covering the entire moving range is given by:

(720×2)×(486×½)=349,920 frames       (2)

Conversion of this number in terms of an image reading rate (60 fields (namely, 30 frames)/second) reveals that bulk or large capacity disk array unit, which can record images thereon for about three hours or more, is needed.

Namely, the bulk disk array unit should be used to read all background images, which correspond to a real movement of the camera, from the disk array unit. Thus, a novel idea is necessary for further reducing the cost.

Further, because all of the background images to be read from the disk array unit are recorded thereon as frame images, such background images correspond to frames, respectively (that is, are read in frame units).

It is, however, usual that a dynamic image video signal gained by taking a moving object is displayed by performing an interlaced scanning, such as each of odd-numbered and even-numbered field images (that is, each field images). Namely, the dynamic image video signal is displayed in field units.

Thus, when displaying the dynamic image video signal in frame units, there is a fear that the motion of the moving object in the displayed images in frame units is unnatural. Therefore, a novel idea is further necessary for producing more natural composite images.

So, in accordance with this embodiment, a keying system which uses a low-capacity disk array unit but can produce a real image in response to the movement of the camera and achieves a more real motion of an object in the background images, is realized by adding a novel concept to the first embodiment in the aforementioned point of view.

Figure 8:
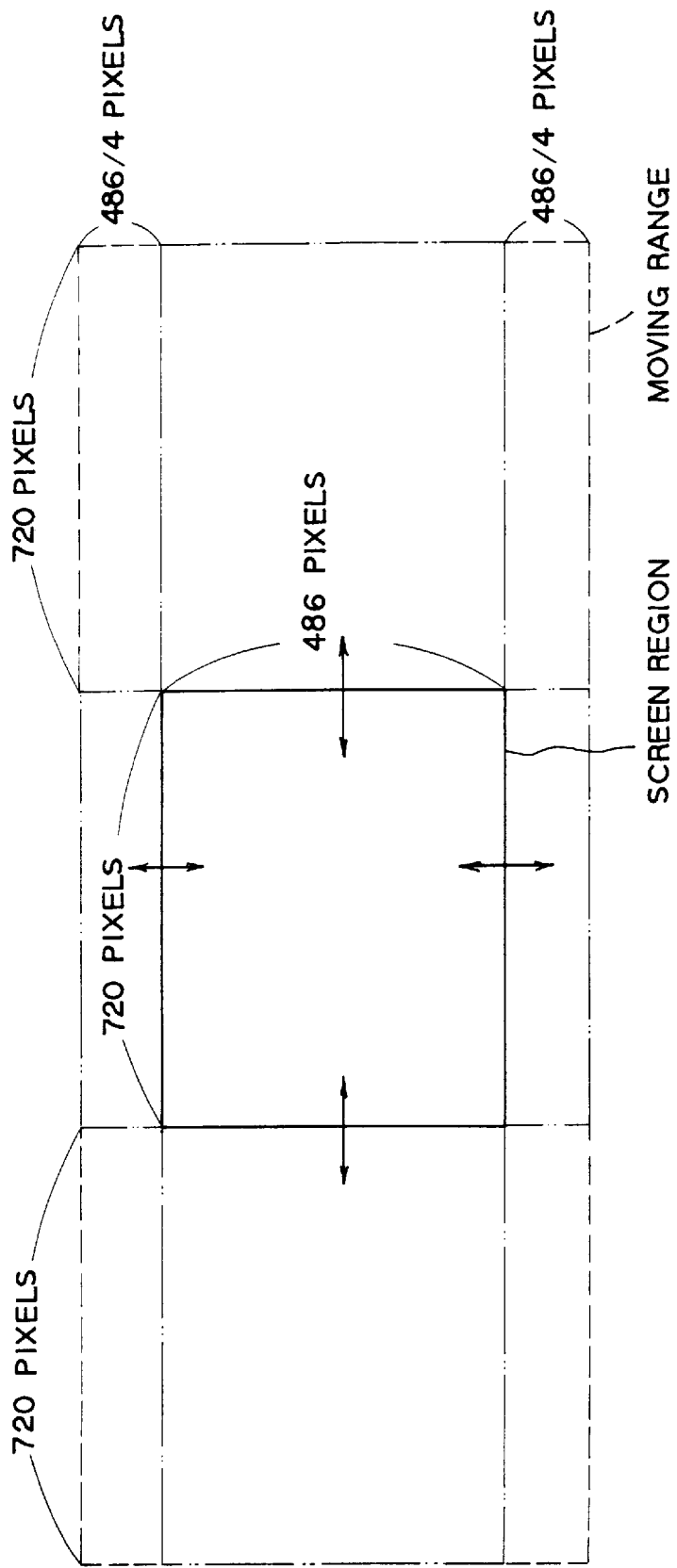
FIG. 8 conceptually shows a screen region of a background image and a moving range corresponding to a movement of a camera.

FIG. 8 is a block diagram for illustrating the entire configuration of a chroma-key system according to such a second embodiment.

Figure 9:
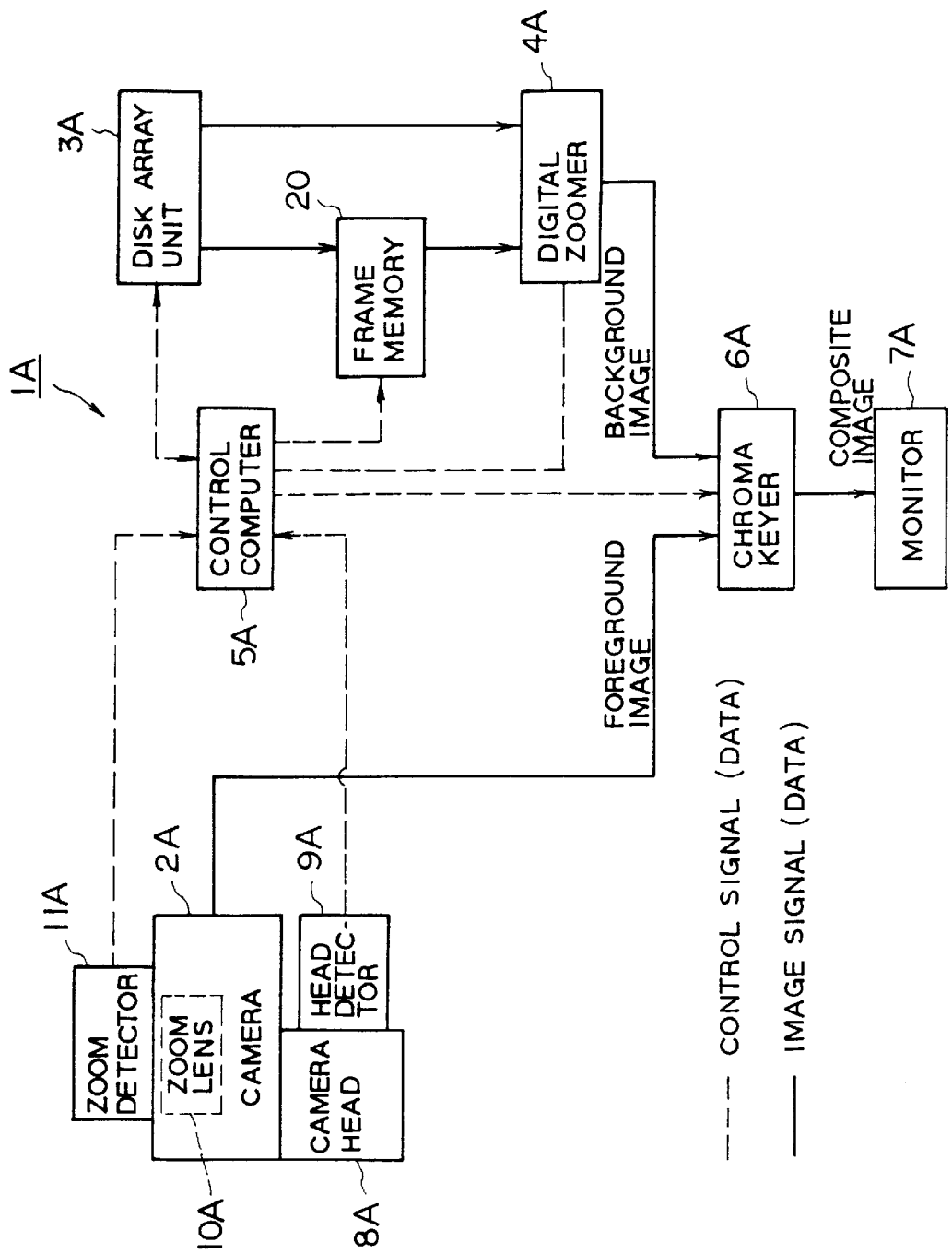
FIG. 9 is a schematic block diagram showing a whole structure of a chroma-key system according to a second embodiment thereof.

In the case of a chroma-key system 1A of FIG. 9, there is provided with a frame memory (buffer memory) 20 between a disk array unit 3A and a digital zoomer 4A. Further, the disk array unit 3A has two video output lines, one of which is directly connected to the digital zoomer 4A, and the other of which is connected to the digital zoomer 4A through the frame memory 20 acting as the buffer memory. This frame memory 20 is constituted by a memory such as a semiconductor memory and is adapted to temporarily hold (store) at least one frame of the background image. Incidentally, operations of writing the frame of the background image to and reading the frame of the background image from the frame memory 20 are performed under the control of the control computer 5A.

Furthermore, in the case of this embodiment, similarly as described in the foregoing description of the example of the modification of the first embodiment, both of changes in angle and in horizontal position of the camera 2A are detected and then a corresponding background image is read out. Background images taken at angular intervals, which correspond to the panning angle and the tilting angle of the camera 2A, and at positional intervals, which correspond to the horizontal movement positions of the camera 2A, are recorded onto the disk array unit 3A. The remaining composing elements of the second embodiment are nearly the same as corresponding elements of the first embodiment, respectively. Thus, like reference characters are assigned to such composing elements, respectively. Further, the descriptions of such composing elements are omitted.

Next, an operation of this embodiment will be described hereunder.

In the case of this embodiment, a camera operator manipulates the camera head 8A thereby changing the image-taking direction (namely, the image-taking angle) and the image-taking position so as to take an image of an object such as an announcer who lies in front of the blue screen. Then, data representing the image taken by the television camera 2A is sent to the chroma keyer 6A as data representing a foreground image, similarly as in the case of the first embodiment.

On the other hand, the panning angle, the tilting angle and the horizontal position of the camera 2A upon taking the image are detected by the head detector 9A and are then sent to the control computer 5A.

Figure 10:
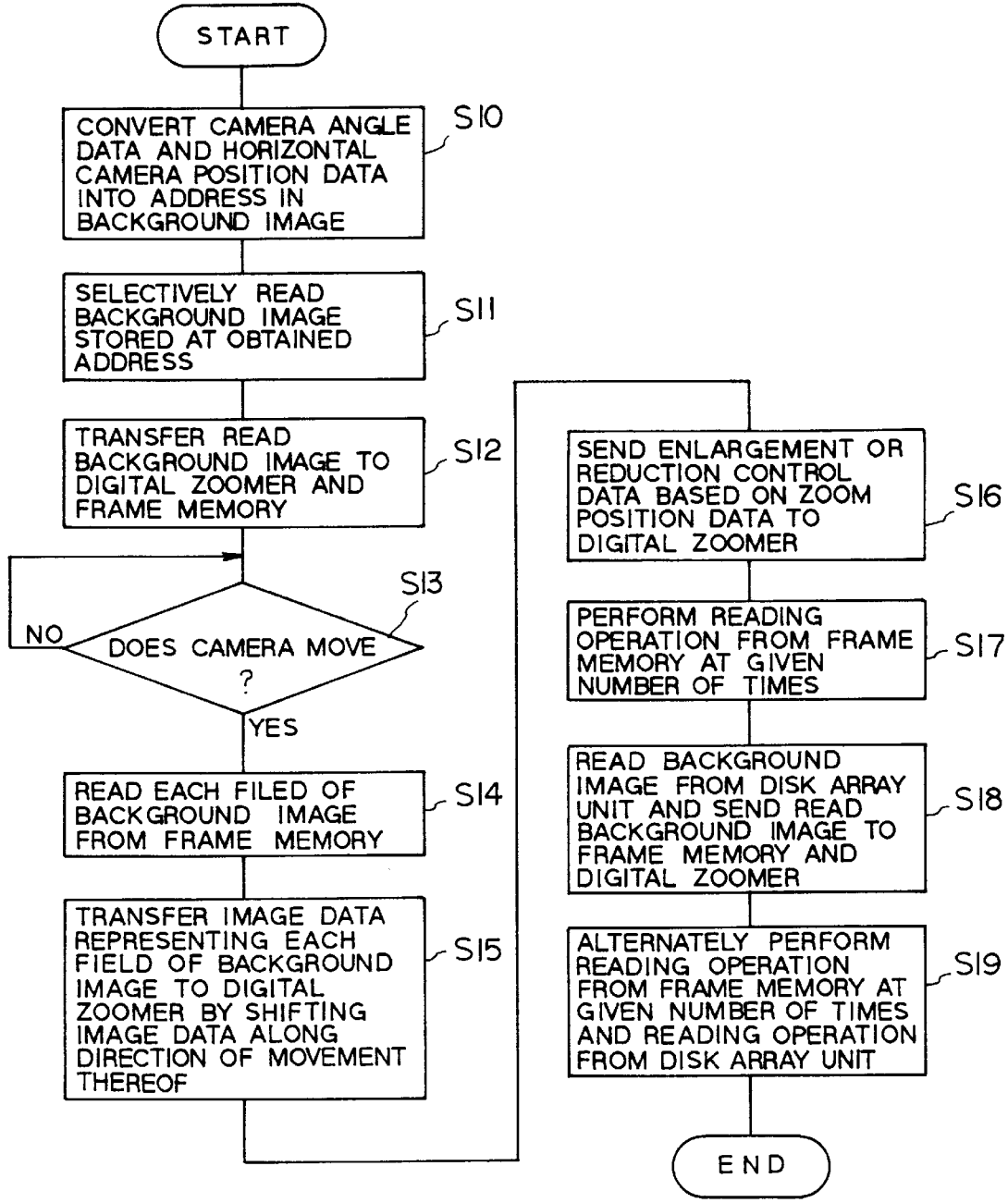
FIG. 10 is a schematic flow chart showing an example of a process performed by a control computer of the second embodiment thereof.

The control computer 5A performs a process of FIG. 10 according to the sent angle data, to the sent horizontal position data and to the zooming position data sent from the zoom detector 11A. Namely, the control computer 5A converts the sent angle data and the sent horizontal position data of the camera 2A into an address in the background image (in step S10). Further, the control computer 5A refers to the disk array unit 3A and selects the background image which is stored at the obtained address therein from the plurality of background images recorded thereon. Moreover, the control computer 5A reads the selected background image therefrom at an image reproducing rate of, for example, 30 frames per second (in step S11). Then, the control computer 5A transfers the read background image to the digital zoomer 4A and the frame memory 20. One of the background image transferred to the digital zoomer 4A is performed the zooming process by the digital zoomer 4A. After that, The processed background image is sent to the chroma keyer 6 so as to perform the keying composition between the foreground image and the processed background image, thereby displaying the composition image between the foreground image and the background image by the monitor 7A, which is the same as description in the first embodiment. Other of the background image transferred to the frame memory 20 is stored therein (in step S12).

At that time, the control computer 5A judges from the angle data and the horizontal position data sent thereto whether or not the camera 2A moves (namely, whether or not the angles and the horizontal position of the camera 2A changes) (in step S13). If it is thus judged that the camera 2A does not move (namely, a result of the judgement is negative (that is, "NO")), the control computer 5A is put into a standby state and the composition image between the foreground image and the background image is continuously displayed by the monitor 7A.

Figure 11:
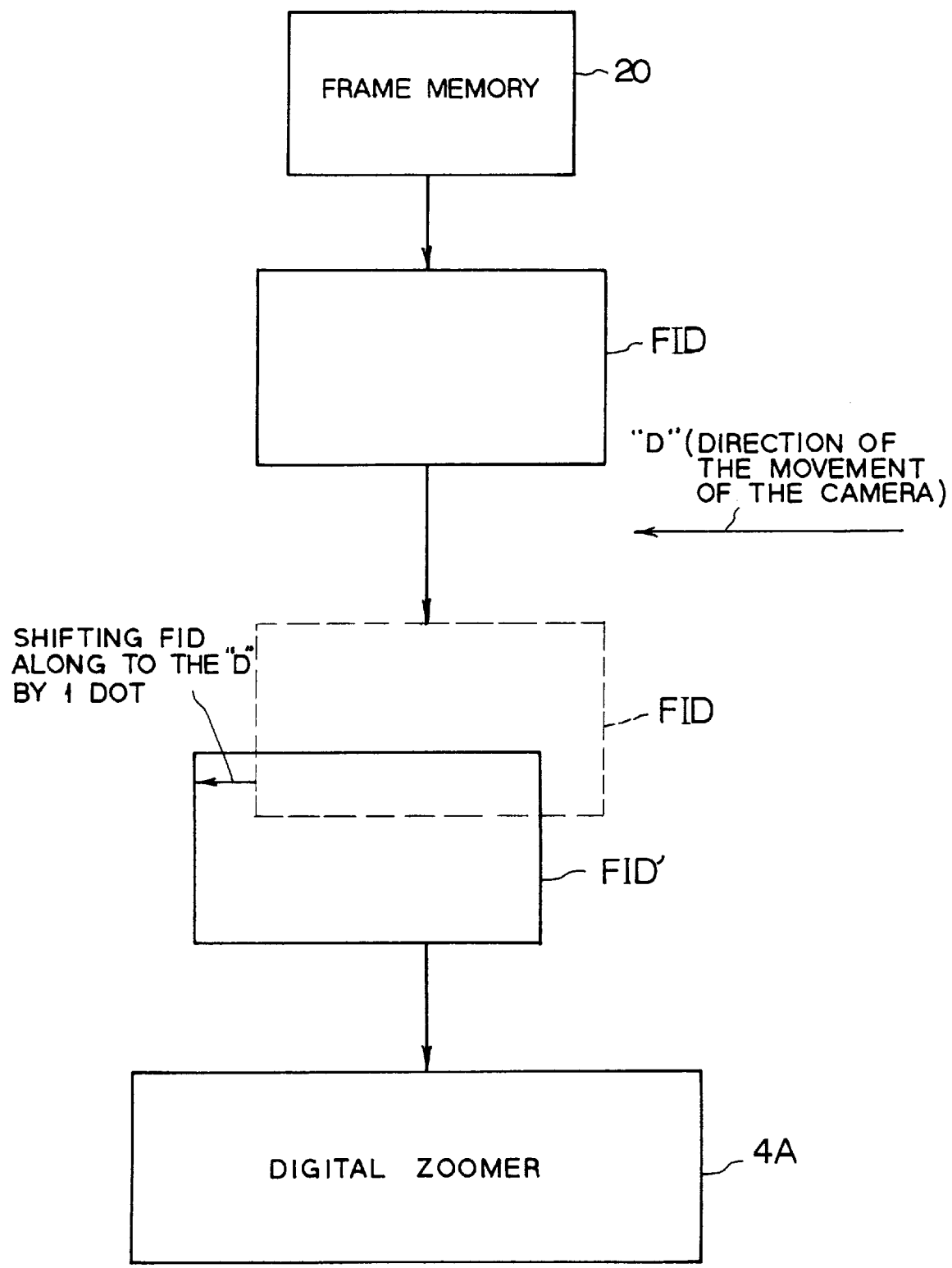
FIG. 11 conceptually shows a shifting process of a field image data of a background image of the second embodiment thereof.

In contrast, in the case that the angles and the horizontal position of the camera 2A change, namely, if it is judged in step S13 that the camera 2A moves within predetermined limits (namely, a result of the judgement is affirmative (that is, "YES")), instead of reading the background image which corresponds to the angles and the horizontal position of the moved camera from the disk array unit 3A, the control computer 5A reads from the frame memory 20 the background image which corresponds to the angles and the horizontal position of the camera 2A prior to the movement and is stored in the frame memory 20. More particularly, the control computer 5A reads odd-numbered field image data and even-numbered field image data of such the background image alternately in field-image units, instead of reading the background image in frame units (in step S14). Further, the field-image data FID of this background image are transferred to the digital zoomer 4A by shifting the data FID in the direction D of the movement of the camera 2A by dots of the number corresponding to the moving distance thereof (namely, the field image data FID of the background image is shifted as the field image data FID thereof by the number of pixels along to the moving direction D, for example, 1 dot, as shown in FIG. 11) (in step S15).

That is, when the panning angle, the tilting angle and the horizontal position of the camera 2A change, the corresponding background image changes in the three-dimensional manner. Thus, when the background image is read from the disk array unit 3A, the background image naturally changes in a three-dimensional manner. It is, however, usual that the movement (namely, the change in angle and so forth) of the camera 2A is small. Therefore, in the case of the second embodiment, the change of the background image corresponding to the movement of the camera 2A is represented by a two-dimensional motion of the background image stored in the frame memory 20. Further, upon completion of the processing to be performed in step S15, an operation to be performed by the control computer 5A is changed over to an operation to be performed in step S16.

In step S16, the control computer 5A sends to the digital zoomer 4A the enlargement or reduction data based on the sent zooming position data (namely, the enlargement-ratio or reduction-ratio data) (in step S16).

Thereafter, the control computer 5A performs a reading operation of reading the image from the aforementioned frame memory 20 a given number of times (for instance, 1 through 10 times) according to the angle data and the horizontal position data (in step S17), which are serially sent from the camera 2A in response to the movement thereof. After performing the reading operation the given number of times, if the angles and the horizontal position are changed to be over the predetermined limits, the control computer 5A reads from the disk array unit 3A the frame image data of the background image stored at an address corresponding to the angle data and the horizontal position data this time. Subsequently, the control computer 5A sends the read frame image data to the digital zoomer 4A and the frame memory 20 (in step S18). Thereafter, the control computer 5A performs the operation of reading the background images from the frame memory 20 the given number of times and the operation of reading the frame image data from the disk array unit 3A alternately and repeatedly (in step S19). Subsequently, the enlargement/reduction processing and the keying composition are performed, similarly as in the case of the first embodiment.

Namely, in the case of the second embodiment, the background image to be read from the disk array unit 3A is read once each time after the background image is read from the frame memory 20 the given number of times. Thereby, the storage capacity of the disk array unit 3A can be reduced.

For example, it is assumed that, when the movement of the background image corresponding to the movement of the angles and the horizontal position of the camera 2A is exceeded by four pixels, the background image in the disk array unit 3A is read in frame units and when the movement of the background image corresponding to the movement of the camera 2A is not exceeded by four pixels, the background image in the frame memory 20 is read in field units and that the method of the present invention is performed in the moving range of the camera 2A of FIG. 8, the number of necessary recording images (namely, the number of frames) stored in the disk array unit 3A is reduced to (1/16) of that in the case of reading the images from only the disk array unit 3A. So, the necessary number of recording images for the disk array unit 3A in this case is obtained by:

$$349,920(\text{frames})/16 = 21,870 \text{ (frames)} \quad (3)$$

This number corresponds to a recording time of about 12 minutes and is a value which is sufficiently practically allowable, judging from the current state-of-the-art in technologies.

Consequently, in the case of the second embodiment, the capacity of the disk array unit can be reduced to low capacity. Further, the cost of the chroma-key system can be decreased to a low level.

Furthermore, in addition to the reduction in cost, the reading of the background images can be performed in field units. Thus, a more natural motion of each objects in the background image can be realized. Further, the more real composite image can be produced.

Moreover, in the case of this embodiment, the background image is read from the disk array unit 3A once each time after the background image has been read from the frame memory 20 a given number of times. In other words, this means that the background image has been already read from the frame memory 20 a plurality of times during the interval of reading the background image from the disk array unit 3A. Thus, the timing of reading the background image from the disk array unit 3A and the timing of reading the background image from the frame memory 20 can be freely controlled according to the contents of the background images.

Namely, in the range where a change of the background image is relatively small or negligible even when the foreground image changes owing to the movement of the camera 2A, the background image is read from the frame memory 20 by shifting the background image. In the case of each of the remaining ranges, the background image is read from the disk array unit 3A. Thereby, a real virtual studio can be realized by using a disk array unit and a memory, which are of small capacity.

Incidentally, in steps S14 and S15 of the aforementioned process to be performed by the control computer 5A, background images are first read from the frame memory 20 and then the operation of the movement of the image data of the background image is performed. However, the operation of the movement of the image data of the background image may be first performed and subsequently, the background image obtained after the movement may be read out.

Figure 12:
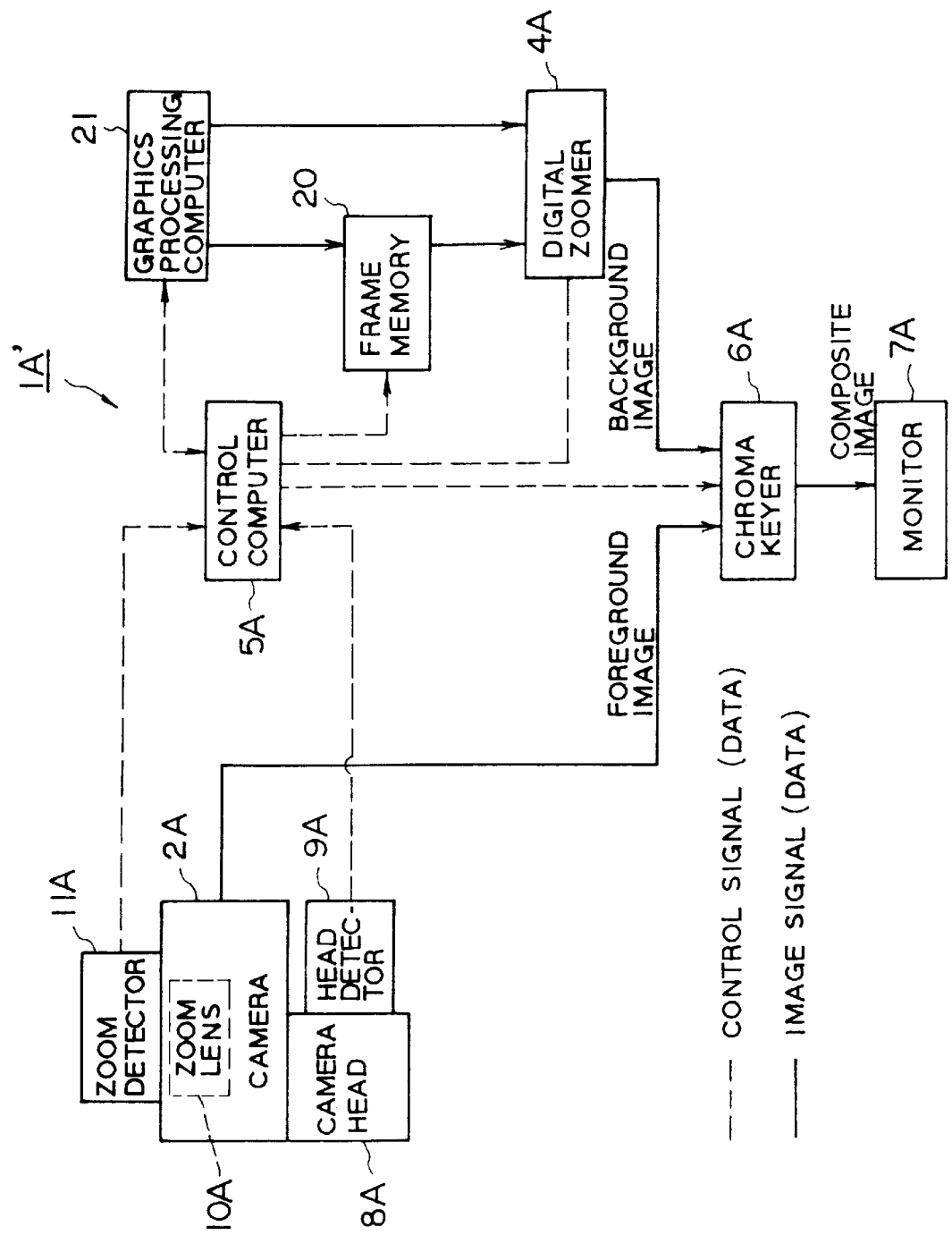
FIG. 12 is a schematic block diagram showing a whole structure of a chroma-key system according to an example of a modification of the second embodiment thereof.

Further, the system, to which the aforesaid method for reading the background image in field units is applied, is not limited to the aforementioned system in which the background image is read from the disk array unit. This method can be applied to, for example, the keying system having a graphic processing computer 21, by which a background image is produced in real time by performing CG processing such as a real time rendering, instead of the disk array unit 3A, as illustrated in FIG. 12.

That is, in the case of the graphics processing computer 21, a background image is produced by performing the computer graphics processing according to the angle data and the horizontal position data of the camera 2A. Further, the control computer 5A is adapted to read the background image produced by the graphics processing computer 21 in steps S10 and S11.

At that time, the background image produced by the graphics processing computer 21 is read out in frame units. Thus, the method of this embodiment, by which the background image is read in field units through the frame memory 20 by shifting the background image in the range where the motion of each object in the background is negligible, can be applied to such the keying system. Thereby, a natural motion of each object in the background image can be realized.

Meanwhile, the second embodiment uses the camera head provided with the head detector for detecting at least one of the panning angle, the tilting angle and the horizontal position of the camera. The camera head to be used in the system of the present invention is not limited to such a camera head. The camera head which can be moved by using the input unit as illustrated in FIG. 5 may be used.

In the foregoing descriptions of the first and second embodiments, each of the keying systems of the present invention has been described as chroma-key system. The keying system of the present invention is not limited to such a chroma-key system. A keying system using a luminance key and a keying system using the combination of a luminance key and a chroma key may be realized as the keying system of the present invention.

In the case of the first and second embodiments, the disk array unit are used as a storage medium for recording a background image thereon. The storage medium of the present invention is not limited to the disk array unit. Ordinary disk units (such as hard disk units) may be used as the storage medium. Moreover, not only a hard disk but also a memory, for instance, a semiconductor memory may be used as the storage medium.

Meanwhile, in each of the aforementioned embodiments, a camera such as a television camera for obtaining a foreground image can be used. The camera to be used for gaining foreground images in the system of the present invention is not limited to the television camera.

For example, various kinds of image-taking devices such as a scanner for static images and a sequential scanning camera may be used in the system of the present invention. In this case, two-dimensional images gained by the image-taking devises are used instead of the foreground images gained by the camera. Moreover, images produced by the computer graphics processing may be used therein instead of the foreground images gained thereby.

Figure 13:
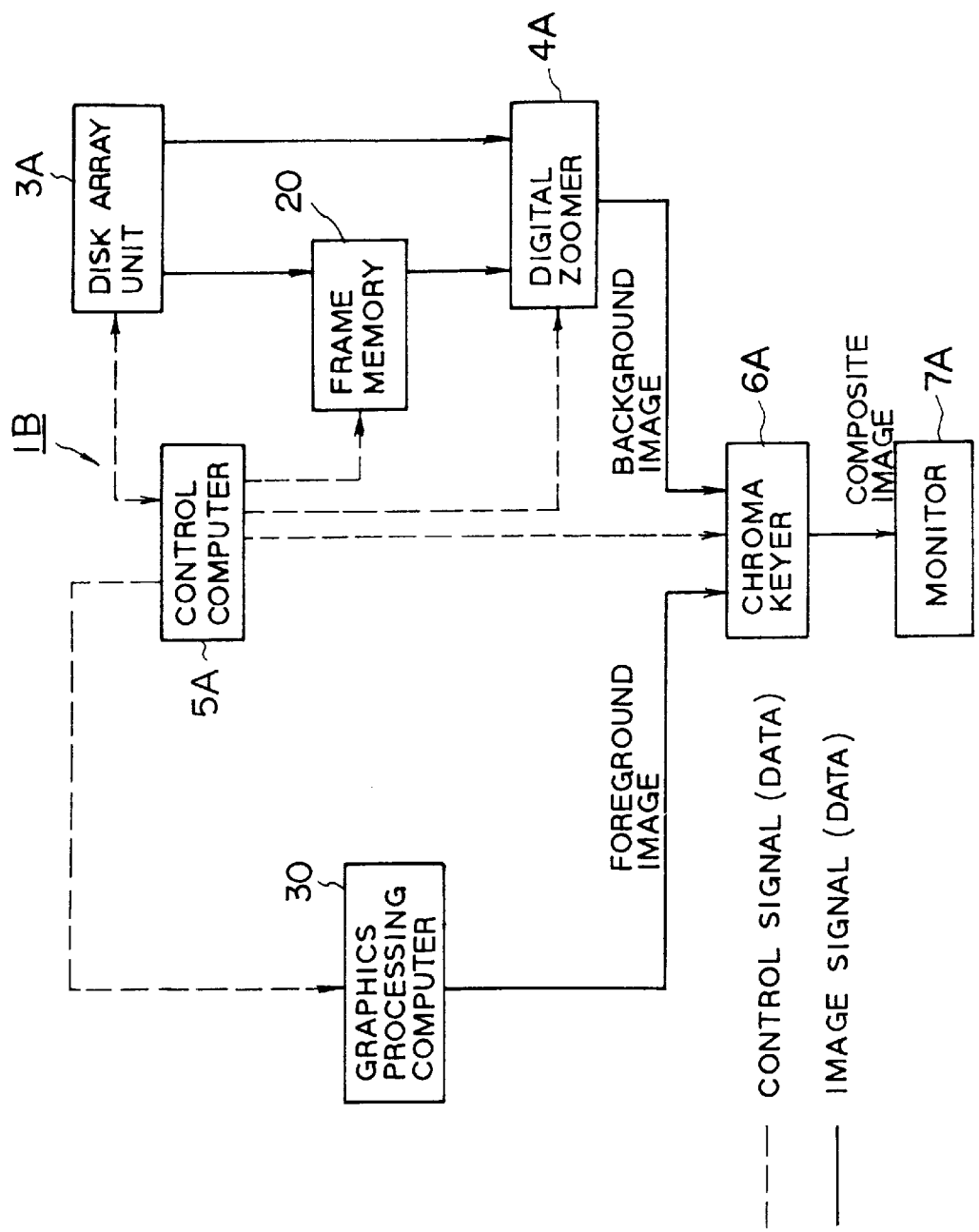
FIG. 13 is a schematic block diagram showing a whole structure of a chroma-key system according to an example of a modification according to the present invention.

Referring now to FIG. 13, there is shown a chroma-key system 1B which has a graphics processing computer 30 instead of the camera 2A.

In the case of the system of FIG. 13, when using the graphics processing computer 30, an image (a foreground image) of an object such as announcer, which is viewed from a certain point (a point of view), is produced by the graphics processing computer 30. Further, at least one of a view angle of the point of view and a view position thereof is sent to the control computer 5A. Then, after processed by the control computer 5A, the background image which corresponds to an angle corresponding to information according to the view angle, is read from the disk array unit 3A.

Further, as illustrated in FIG. 13, the keying composition between the foreground image produced by the graphic processing computer 30 and the background image is performed, instead of using the foreground image taken by the camera.

Figure 14:
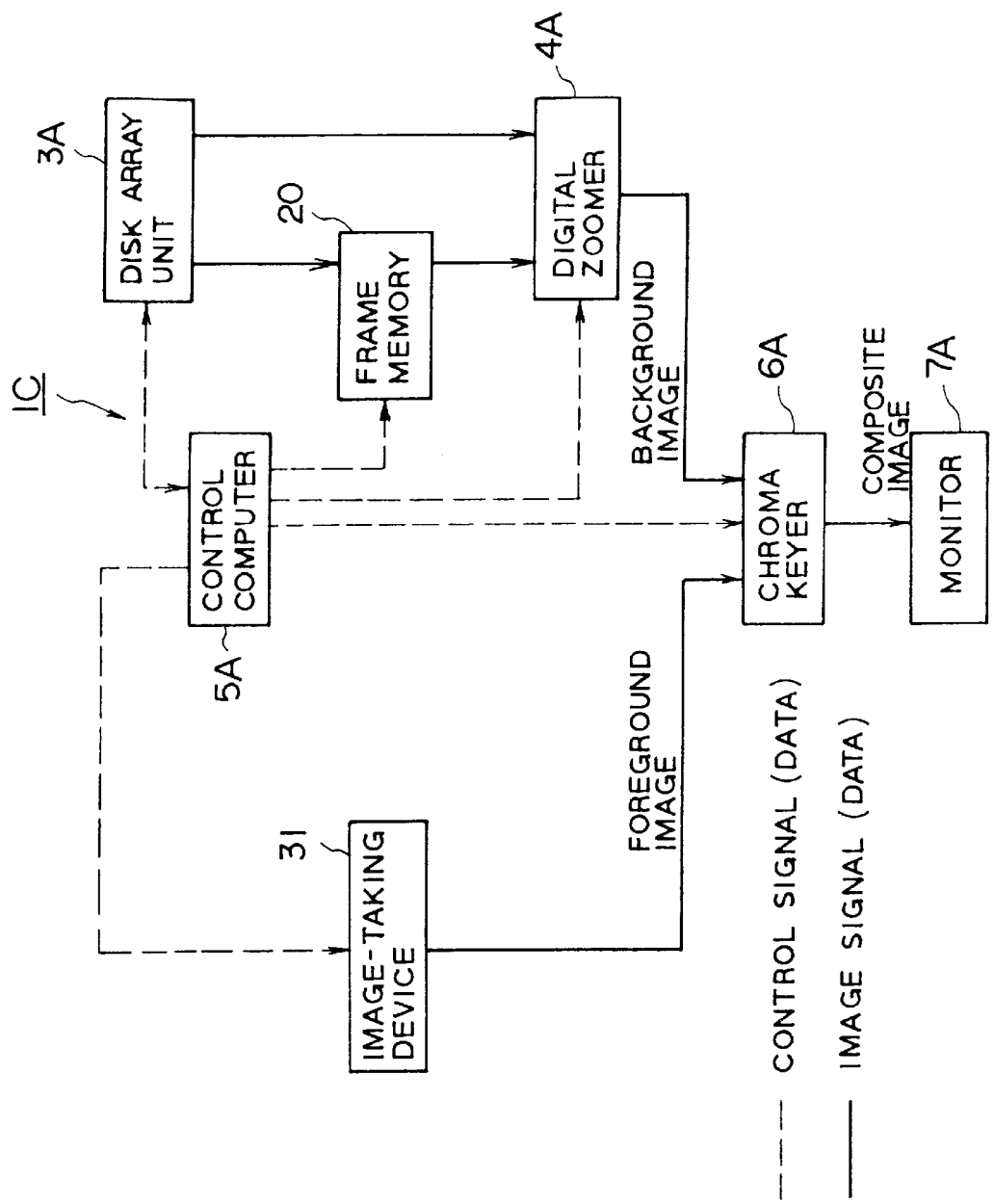
FIG. 14 is a schematic block diagram showing a whole structure of a chroma-key system according to an example of a modification according to the present invention.

Moreover, referring now to FIG. 14, there is shown a chroma-key system 1C which has an image-taking device 31 such as a scanner for static images or a sequential scanning camera instead of the camera 2A.

In the case of the system FIG. 14, when using the image-taking unit 31 such as a scanner for static images, a picture or the like on which an object is shown is scanned by the image-taking device 31 so as to produce a two-dimensional image (namely, a foreground image). At least one of the view position and the view angle (for example, the view angle) in a three-dimensional space is designated by performing the process by means of the control computer 5A. A background image corresponding to the designated view angle is read from the disk array unit 3A.

Furthermore, in the case of the system of FIG. 14, the keying composition between the foreground image produced by the image-taking device 31 and the background image is performed, instead of using the foreground image taken by the camera.

Figure 15:
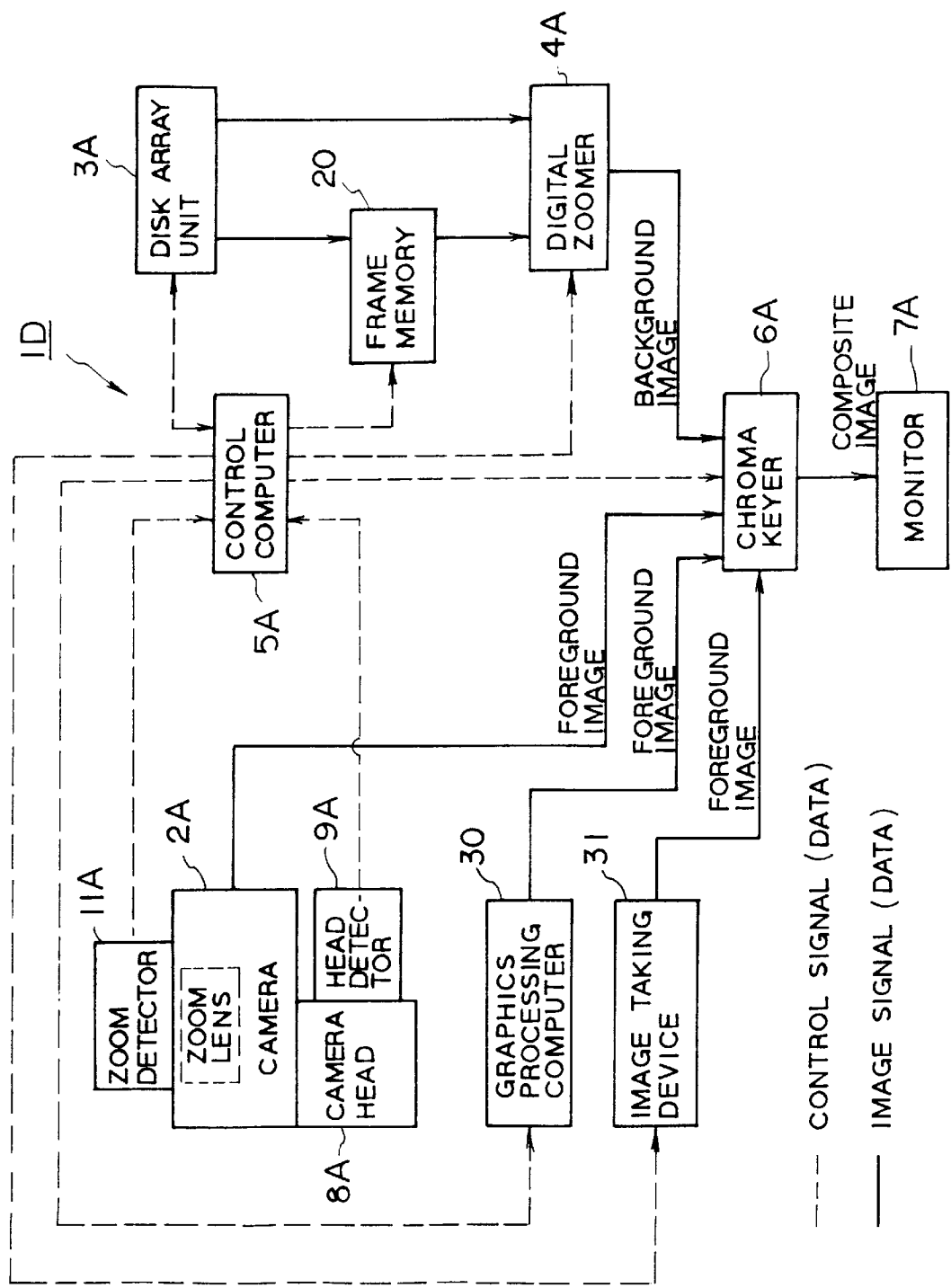
FIG. 15 is a schematic block diagram showing a whole structure of a chroma-key system according to an example of a modification according to the present invention.

In addition, referring now to FIG. 15, there is shown a chroma-key system ID which has the graphics processing computer 30 and the image-taking device 31 in addition to the camera 2A.

In the case of FIG. 15, one of the image taken by the camera 2A, the image taken by the graphics processing computer 30, and the image taken by the image-taking device 31, which is chosen as the occasion need.

Therefore, the present invention can be applied not only to the system, in which the foreground image is actually taken by the camera, but also to the system in which the foreground image is obtained by the computer graphic processing or by the scan image-taking device.

Meanwhile, the first and second embodiments use the camera head provided with the head detector for detecting at least one of the panning angle, the tilting angle and the horizontal position of the camera. The camera head of the system of the present invention is not limited to such a camera head. As long as devices have detectors being capable of detecting the aforementioned angle/position, the devices such as a dolly and a pedestal may be used in the system of the present invention.

In the foregoing description, the systems of the present invention have been described in such a manner as to have only one camera for taking a foreground image. The present invention, however, is not limited to such systems. For instance, the system of the present invention may have two or more cameras for taking at least one foreground images. Further, the system of the present invention may have a plurality of cameras for taking at least one foreground images and may use a plurality of cameras placed behind the background. In the case of such systems of the present invention, effects similar to those of each of the aforementioned embodiments can be obtained. In addition, the keying composition between the foreground images taken by cameras and the background image can be performed thereby improving the interest of the composite image.

Furthermore, in the aforementioned embodiments, the system is constructed in that the background image is read from the disk array unit. However, the present invention is not limited to the system. The system may be constructed in that a plurality of background images are read therefrom.

In this construction, the keying composition between the foreground image and the plurality of background images can be performed thereby improving the originality and the interest of the composite image.

While the present invention has been particularly shown and described with reference to preferred embodiments thereof, it will be understood by those skilled in the art that the foregoing and other changes in form and details can be made therein without departing from the spirit and scope of the present invention.

What is claimed is:

1. A keying system comprising:
   means for gaining an image of an object;
   a memory device for preliminary storing a plurality of background images each being obtained correspondingly to at least one of a view angle of a view point in a three-dimensional space to be imaged and a view position of the view point therein;
   a buffer memory capable of storing at least one frame of the background image thereon;
   first reading means for selectively reading at least one image at a given timing from the plurality of background images stored in the memory device according to the at least one of the view angle and the view position preliminary both defined in accordance with the image of the object;

storage means for storing the at least one image read by the first reading means on the buffer memory;

means for judging whether or not the at least one of the defined angle and the defined position on the image of the object is changed within predetermined limits corresponding to a predetermined number of pixels;

second reading means for reading the at least one image stored in the buffer memory with shifting the at least one image by at least one pixel each along a direction of the change in case that the at least one of the defined angle and the defined position is changed within the predetermined limits;

third reading means for selectively reading at least one image at the given timing from the plurality of background images stored in the memory device according to the at least one of the defined angle and the defined position in case that the at least one of th e defined angle and the defined position is c hanged over the predetermined limits, first keying-composition means for performing a keying composition between the at least one image read by the second reading means and the image of the object thereby producing a composite image; and second keying-composition means for performing a keying composition between the at least one image read by the third reading means and the image of the object thereby producing a composite image.

2. A keying system according to claim 1, wherein each of said first and second keying-composition means has a chroma-key means performing chroma-keying composition and wherein said memory device has a disk array unit preliminarily storing the plurality of background images.

3. A keying system according to claim 2, wherein said gaining means comprises camera means having a camera for taking the image of the object lying in front of a screen for chroma-keying and having a camera head on which the camera is mounted for variably controlling at least one of an image-taking angle of the camera and an image-taking position thereof, and wherein said defined view angle corresponds to the image-taking angle of the camera at a time of taking the image and said defined view position corresponds to the image-taking position thereof at the time thereof.

4. A keying system according to claim 3, wherein said second reading means is adapted to read the at least one image stored in the buffer memory in field units.

5. A keying system according to claim 3, further comprising detecting means mounted on the camera head for detecting the at least one of the image-taking angle and the image-taking position and zoom detection means mounted on the camera for detecting a zoom position of a zoom lens thereof, wherein said control means comprises selection means for selectively reading the at least one image from the plurality of background images stored in the memory device according to the detected at least one of the image-taking angle and the image-taking position and setting means for setting an enlargement ratio or a reduction ratio for the selected at least one image according to the detected zooming position, said keying-composition means has enlargement/reduction means for performing an enlargement or reduction process of the selected at least one image according to the enlargement ratio or to the reduction ratio and said chroma keyed performs the chroma-keying composition between the enlarged or reduced at least one image and the image of the object thereby producing the composite image.

6. A keying system according to claim 4, further comprising means for displaying the composite image.

7. A keying system according to claim 1, wherein said memory device is a semiconductor memory.

8. A keying system according to claim 1, wherein said memory device is composed of a parity-checked RAID system.

9. A keying system according to claim 1, wherein each of said plurality of background images is stored in non-compressed format.

10. A keying system according to claim 1, wherein each of said plurality of the background images is stored in compressed format.

11. A keying system according to claim 4, wherein said system further comprises means for delaying a timing of the image of the object transmitted to the chroma keyed from the camera means in that a transmitting timing of the at least one image transmitted thereto from the setting means is substantially the same as the transmitting timing of the image of the object.

12. A keying system according to claim 2, wherein said gaining means comprises producing means for producing the image of the object by computer graphics processing, said image thereof corresponding to the at least one of the view angle and the view position.

13. A keying system according to claim 2, wherein said gaining means comprises an image-taking device for scanning a picture on which the object is shown so as to produce the image of the object, said image thereof corresponding to the at least one of the view angle and the view position.

14. A keying system according to claim 1, wherein:

a memory device for preliminary storing a plurality of background images each being obtained correspondingly to at least one of a view angle of a view point in a three dimensional space to be imaged and a view position of the view point therein;

camera means having a camera for taking an image of an object;

input means for inputting at least one of an image taking angle data of the camera and an image-taking position data thereof;

variable control means on which the camera is mounted for variably controlling at least one of an image-taking angle of the camera and an image-taking position thereof according to the at least one of the image-taking angle data and the image-taking position data inputted by the input means so as to take the image of the object by the camera means on the basis of the at least controlled image-taking angle and the controlled image-taking position.

15. A keying system according to claim 13, wherein said variable control means comprises a camera head on which the camera is mounted for changing the at least one of the image taking angle and the image-taking position and a camera head controller for controlling the camera head so that the at least one of the image-taking angle and the image-taking position is defined correspondingly to the at least one of the image-taking angle data and the image-taking position data.

16. A keying system according to claim 14, further comprising:

comparison means for comparing a time period ($\tau 1$) required to variably control the at least one of the image taking angle and the image-taking position with a time period (τ2) between at a moment at which the at least one of the taking angle data and the image-taking position data is inputted to the control means and at a moment at which the at least one image is outputted to the keying-composition means; and adjustment means for adjusting at least one of the time period (τ1) and the time period (τ2) on the basis of the comparison result of the comparison means whereby the time period τ1 becomes substantially equal to the time period τ2.

17. A keying system according to claim 15, wherein, when the comparison means judges that the time period (τ2) is larger than the time period (τ1), said adjustment means is adapted to delay the variable-control timing of the variable control means according to the at least one of the image taking angle data and the image-taking position data so that the time period (τ1) becomes substantially equal to the time period (τ2).

18. A keying system according to claim 15, wherein, when the comparison means judges that the time period (τ1) is larger than the time period (τ2), wherein said adjustment means is adapted to regulate the timing of reading the at least one image from the plurality of background images stored in the memory device according to the at least one of the view angle data and the view position data so that the time period (τ2) becomes substantially equal to the time period (τ1).

19. A keying system comprising:

means for gaining an image of an object;

a graphics computer for producing at least one background image by computer graphics processing, said at least one background image being produced correspondingly to at least one of a view angle of a view point in a three-dimensional space to be imaged and a view position of the view point therein;

a buffer memory capable of storing at least one frame of the background image thereon;

first reading means for reading the at least one background image produced by the graphics computer at a given timing according to the at least one of the view angle and the view position preliminary both defined in accordance with the image of the object;

storage means for storing the at least one image read by the first reading means on the buffer memory;

means for judging whether or not the at least one of the defined angle and the defined position on the image of the object is changed within predetermined limits corresponding to a predetermined number of pixels;

second reading means for reading the at least one image stored in the buffer memory with shifting the at least one image by at least one pixel each along a direction of the change in case that the at least one of the defined angle and the defined position is changed within the predetermined limits;

third reading means for reading at least one background image at the given timing according to the at least one of the defined view angle and the defined view position in case that the at least one of the defined angle and the defined position is changed over the predetermined limits;

first keying-composition means for performing a keying composition between the at least one image read by the second reading means and the image of the object thereby producing a composite image; and second keying-composition means for performing a keying composition between the at least one image read by the third reading means and the image of the object thereby producing a composite image.

* * * * *

UNITED STATES PATENT AND TRADEMARK OFFICE
CERTIFICATE OF CORRECTION

PATENT NO.  : 6,034,740
DATED       : March 7, 2000
INVENTORS   : Kenji MITSUI et al.

It is certified that error appears in the above-identified patent and that said Letters Patent is hereby corrected as shown below:

Claim 1, col. 21, line 21, "th e" should read --the--.

Claim 1, col. 21, line 22, "c hanged" should read --changed--.

Claim 16, col. 23, line 3, "taking angle" should read --image-taking angle--.

Signed and Sealed this

Twentieth Day of March, 2001

*Attest:*

NICHOLAS P. GODICI

*Attesting Officer*      *Acting Director of the United States Patent and Trademark Office*